April 3, 1962 H. W. BILSKY 3,028,536
RECHARGEABLE ELECTRIC BATTERIES
Filed Sept. 30, 1959 8 Sheets-Sheet 1

INVENTOR.
H. W. Bilsky
BY
Greene, Pineles & Dunn
ATTORNEYS

April 3, 1962 H. W. BILSKY 3,028,536
RECHARGEABLE ELECTRIC BATTERIES
Filed Sept. 30, 1959 8 Sheets-Sheet 2

INVENTOR.
H. W. Bilsky
BY
Greene, Pineles & Durr
ATTORNEYS

April 3, 1962   H. W. BILSKY   3,028,536
RECHARGEABLE ELECTRIC BATTERIES
Filed Sept. 30, 1959   8 Sheets-Sheet 3
FIG. 3-A
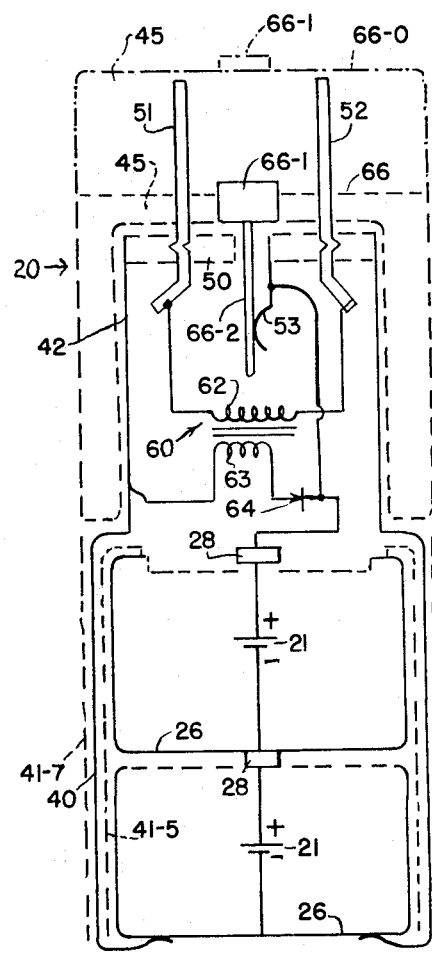
INVENTOR.
H. W. Bilsky
BY
Greene, Pineles & Durr
ATTORNEYS April 3, 1962 H. W. BILSKY 3,028,536
RECHARGEABLE ELECTRIC BATTERIES
Filed Sept. 30, 1959 8 Sheets-Sheet 4
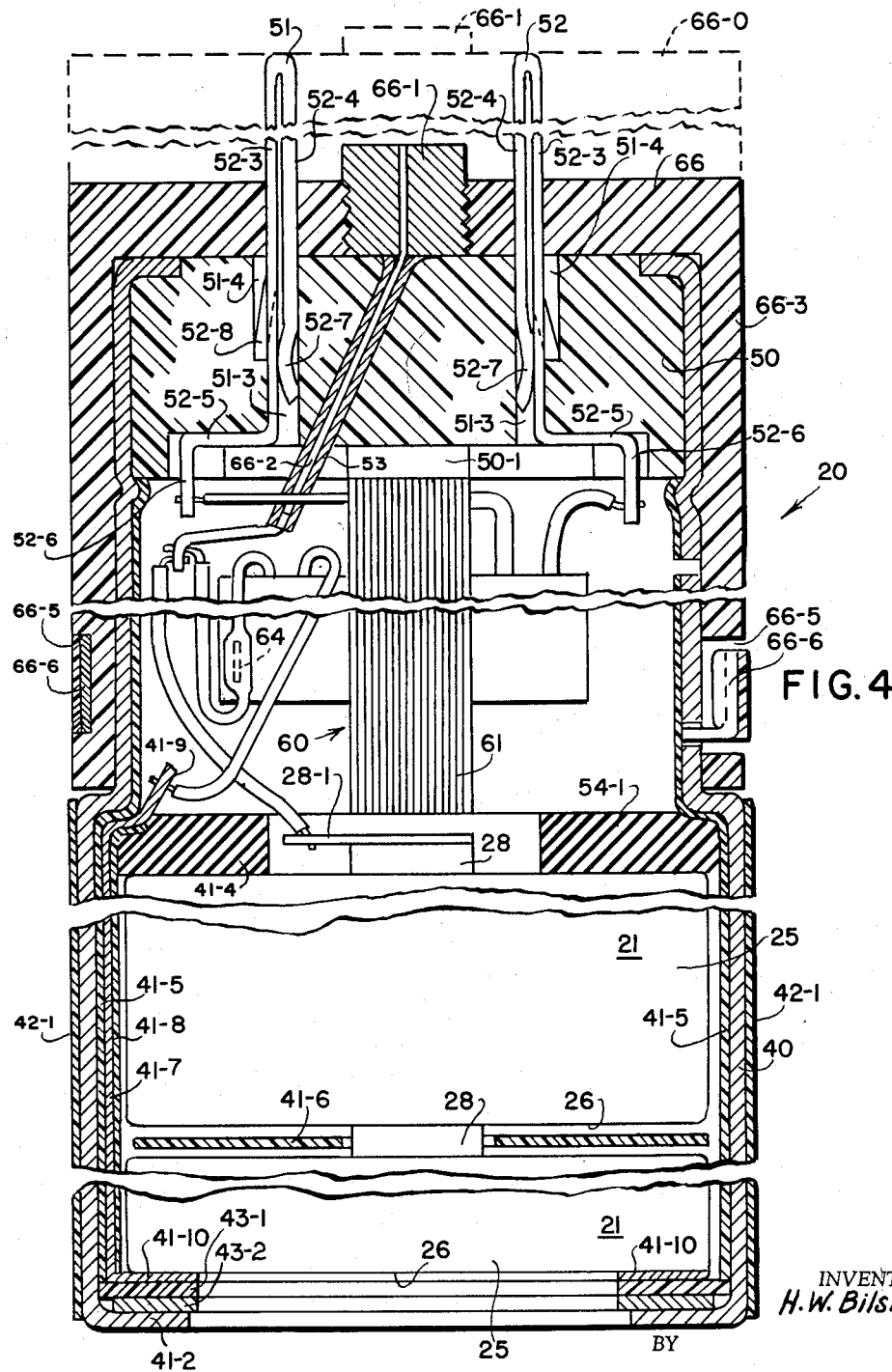

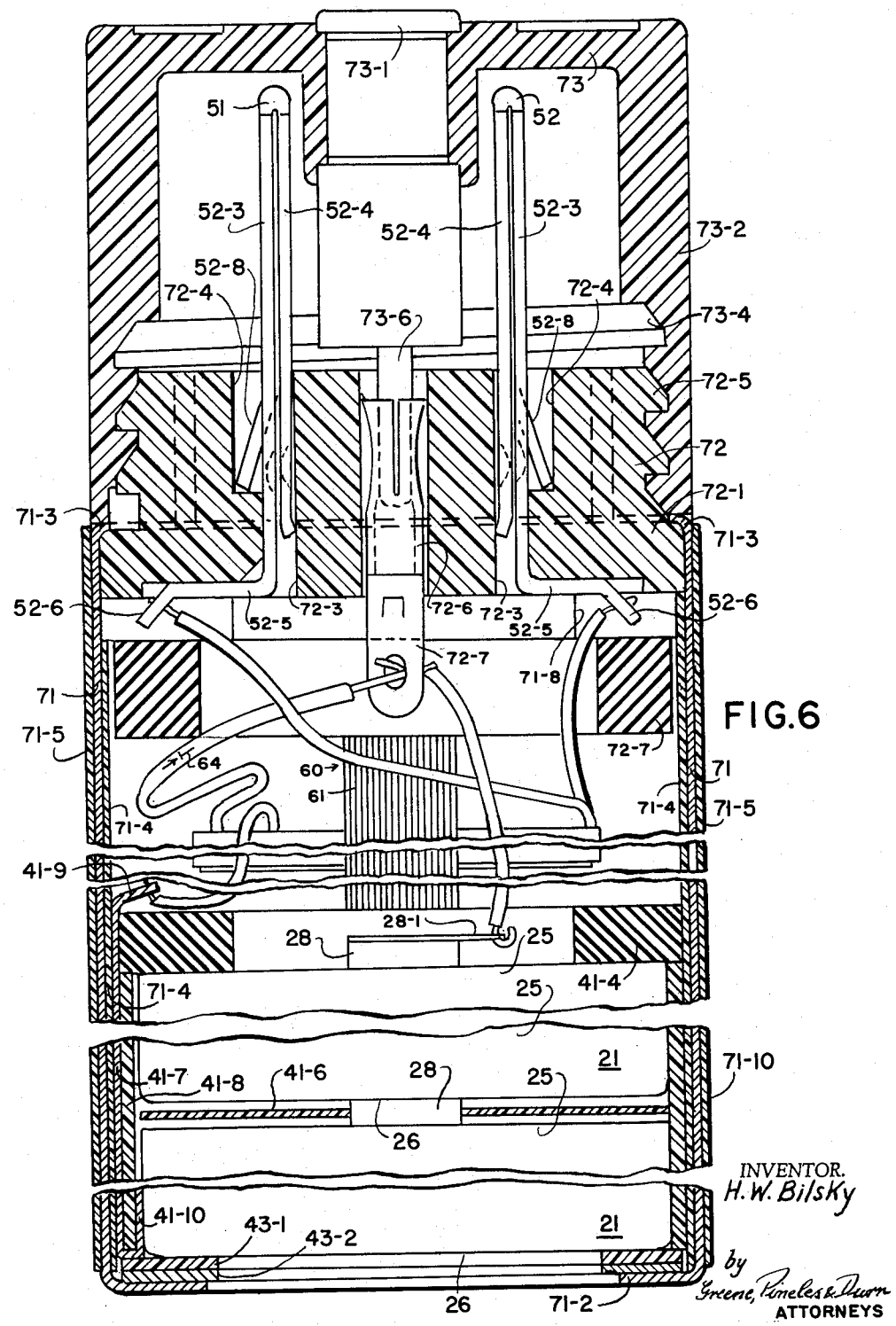

April 3, 1962 H. W. BILSKY 3,028,536
RECHARGEABLE ELECTRIC BATTERIES
Filed Sept. 30, 1959 8 Sheets-Sheet 6

INVENTOR.
H. W. Bilsky
BY
ATTORNEYS

April 3, 1962 H. W. BILSKY 3,028,536
RECHARGEABLE ELECTRIC BATTERIES
Filed Sept. 30, 1959 8 Sheets-Sheet 7

INVENTOR.
H. W. Bilsky
by
Greene, Pineles & Forr
ATTORNEYS

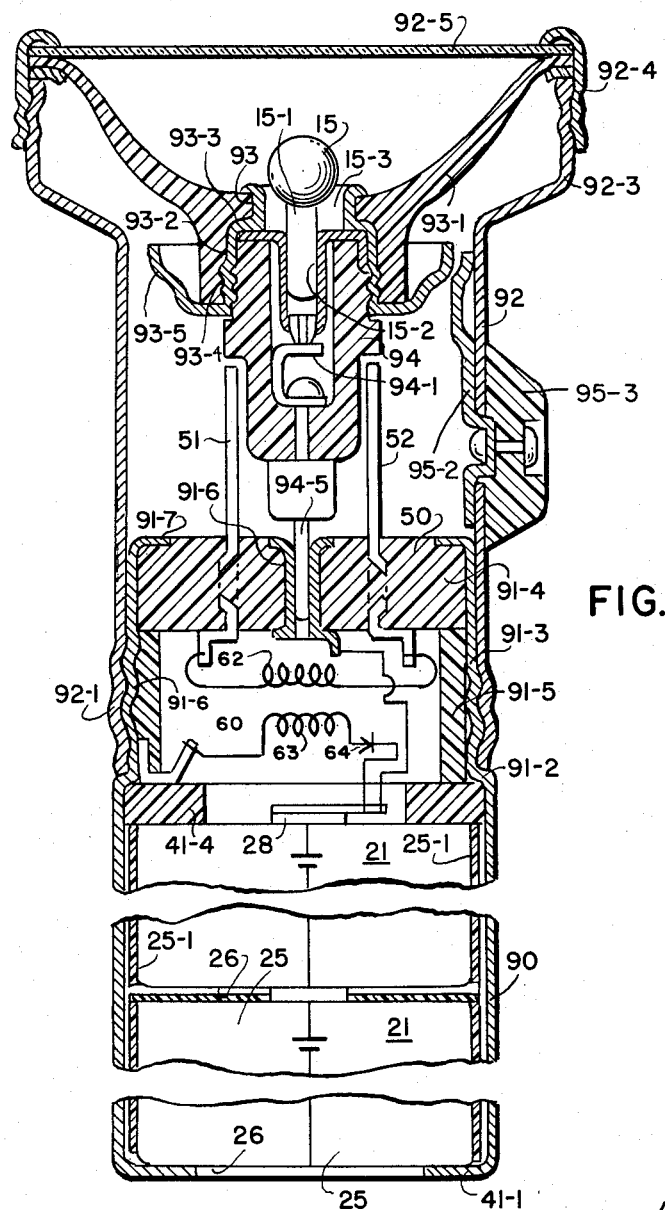

United States Patent Office 3,028,536
Patented Apr. 3, 1962

3,028,536
RECHARGEABLE ELECTRIC BATTERIES
Herbert W. Bilsky, 30 Ehrbar Ave., Mount Vernon, N.Y.
Filed Sept. 30, 1959, Ser. No. 843,559
6 Claims. (Cl. 320—2)

This invention relates to electric batteries, and more particularly to rechargeable electric batteries for flashlights, electric shavers, photograph flash equipment, and analogous devices and appliances.

Conventional portable flashlights, millions upon millions of which have been and are being widely used throughout the world, are as a rule supplied with electric energy from replaceable dry-cell batteries. In recent years, there have also been available, small-capacity flashlights with a built-in, rechargeable battery and rectifying and charging circuits, which could be recharged by plugging in charging terminals of such small flashlight in a wall socket of a conventional, domestic alternating-current power supply.

For use in lieu of the replaceable dry cell of conventional flashlights, there have also been proposed rechargeable battery units having a built-in rectifying charging circuit and charging terminals arranged to be plugged in a conventional alternating-current power supply for periodically recharging such battery. However, the heretofore proposed rechargeable battery units for conventional flashlights, are all deficient because they expose the user to electric shock when plugging in or removing the battery unit from the socket of the electric power supply, unless the user takes special precautions to assure that his body does not contact an exposed electrically-conducting metal part of such battery unit.

Among the objects of the invention is a rechargeable battery unit for a portable flashlight or analogous device embodying means for recharging it from an alternating-current power supply circuit, and which is free of danger of exposure to electric shock when gripping the battery unit when it is plugged in and connected to or removed from the electric power supply circuit.

Among the objects of the invention is a rechargeable battery unit for a flashlight or like device which is foolproof and simple to handle both when removing it and replacing it in the flashlight or like device, and when arranging it for plugging into a power supply socket for recharging its battery cell aggregate by the built-in rectifying and charging circuit.

The foregoing and other objects of the invention will be best understood from the following description of exemplifications thereof, reference being had to the accompanying drawings, wherein.

Figure 3:
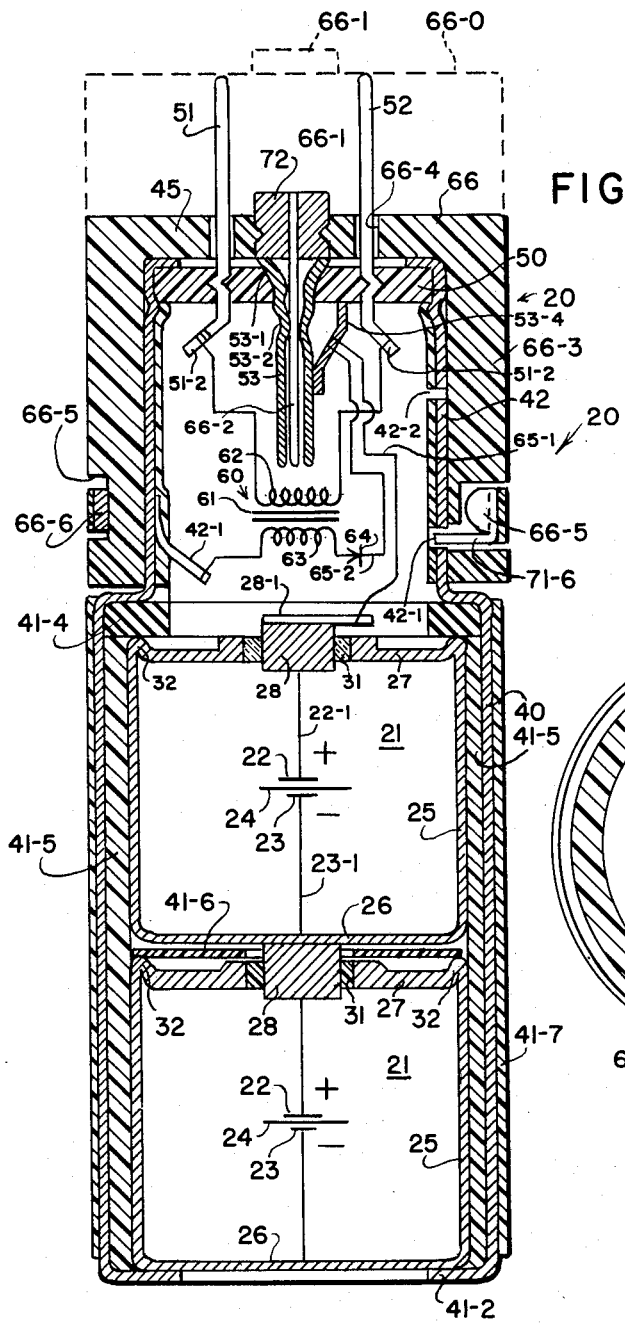
FIG. 3 is a generally diagrammatic view of a rechargeable battery unit exemplifying the invention.
Figure 5:
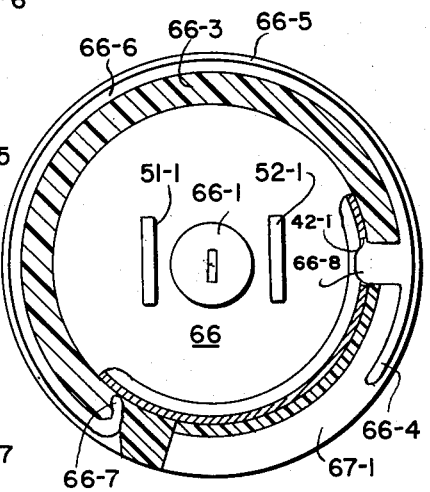
Figure 7:
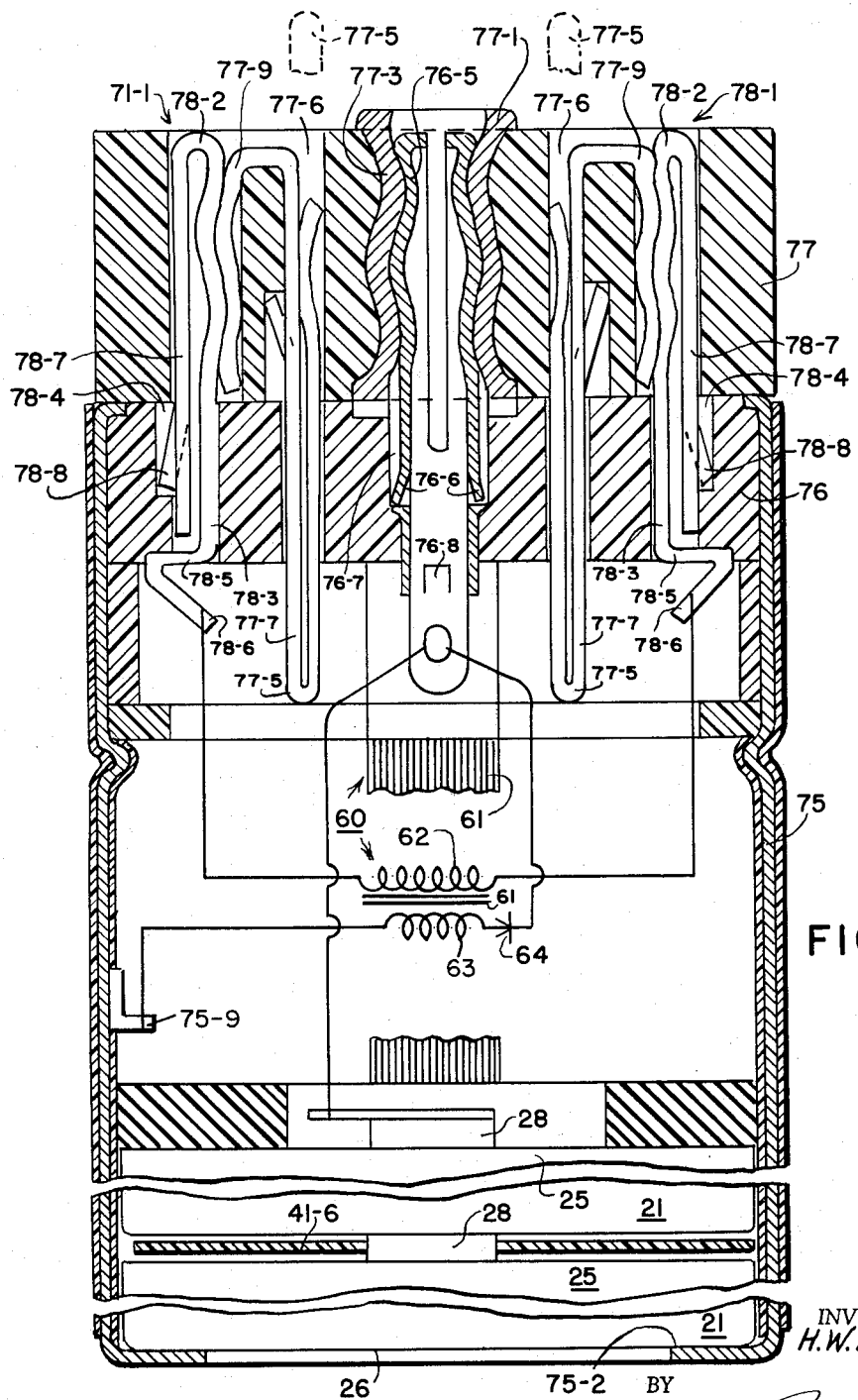
Figure 8:
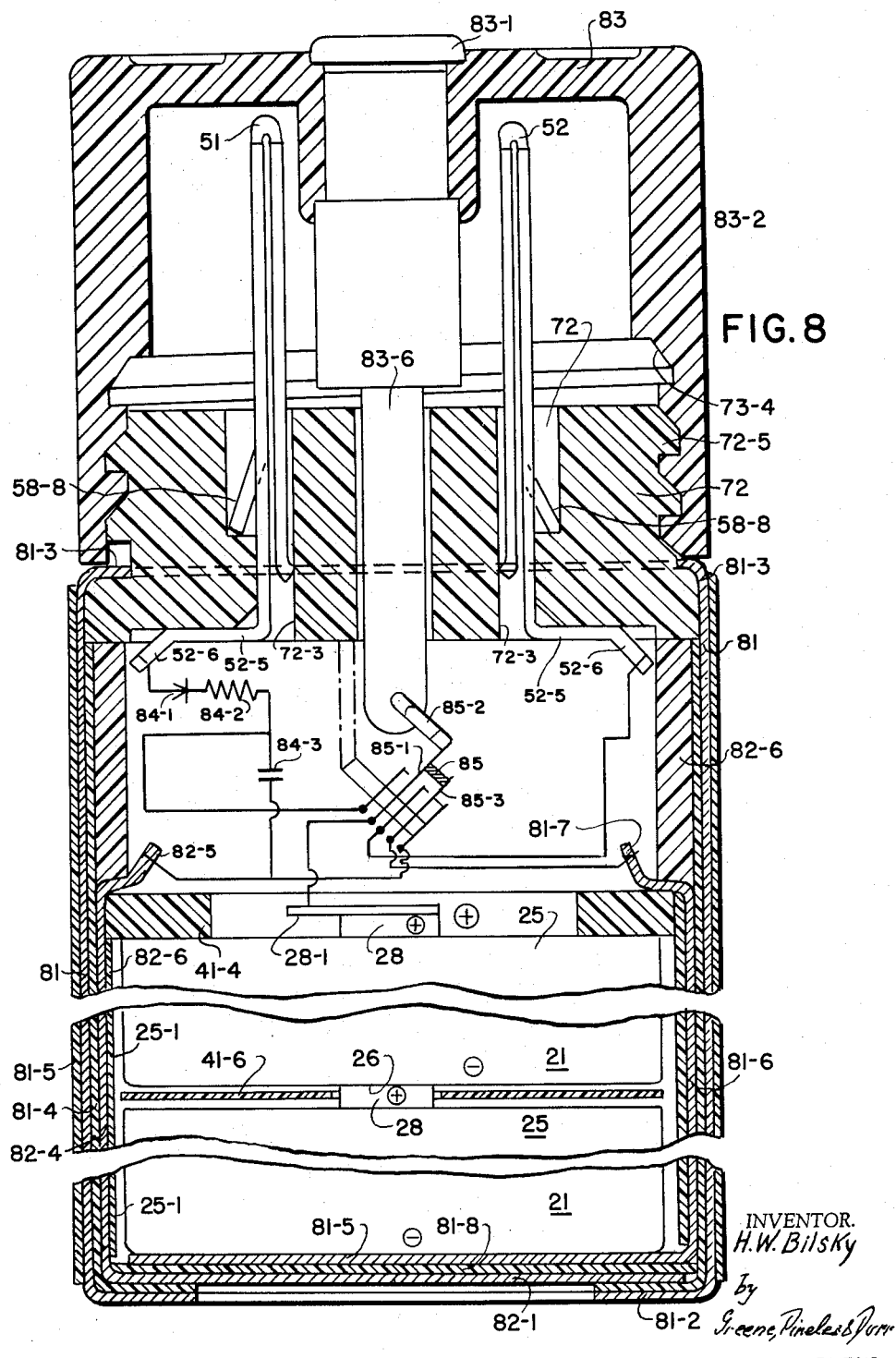

FIG. 3-A is a diagrammatic view showing the circuit relation of the electric components of the same battery unit;

FIG. 4 is a cross-sectional view of a rechargeable battery unit shown in FIG. 3, with some portions modified;

FIG. 5 is a cross-sectional view along line 5—5 of FIG. 4;

FIGS. 6, 7 and 8 are vertical cross-sectional views similar to FIG. 4, of three different other forms of rechargeable battery unit of the invention; and FIG. 9 is a similar cross-sectional view of one form of rechargeable battery unit of the invention combined with a flashlight attachment secured to one end thereof.

For the sake of clarity and simplification of the description, most of the structural dimensions are enlarged, some of the structural dimensions are shown exaggerated, and parts of the structures shown in FIGS. 5 to 8 are broken away to reduce their major longitudinal dimensions.

To illustrate the application of the rechargeable battery unit of the invention, it will be described in connection with one form of a conventional flashlight of the type designed for operation with a plurality or aggregate of conventional, cylindrical dry battery cells, such as the "D" cells, which are 2¼" high and 1¼" in diameter. Such conventional flashlight has a cylindrical casing 10, in most cases of metal, having a wider front or upper end portion 10–1 holding therein a reflector 13 and light bulb 15.

To simplify the description, the upper end of the flashlight housing 10 and its battery unit 20, as seen in the drawings, will be designated as the front or upper end, and the opposite end parts thereof will be designated as the rear or bottom end thereof. The outer rim of the reflector 13 and an overlying transparent lens 13–1 are clamped against the upper rim edge of the wider upper casing end 10–1 by the reentrant inward edge region 11–1 of a lens collar 11–2. The lens collar 11–2 is affixed to the wider upper casing end 10–1 by conventional threaded engagement of their facing surface portions. By way of example, the shown light bulb 15 is of the type having its conventional glass neck portion 15–1 affixed within a metallic bulb terminal collar 15–2 holding affixed in its lower open end, by an insulating junction body 15–3, the central, downwardly-facing bulb terminal 16. At its upper end, the bulb terminal collar 15–2 has a circular contact flange 15–4 by which it is held in central position within the reflector 13 and electrically connected to metallic contact sleeve or member 14 of the flashlight insulatingly held in the central downward region of reflector 13. The two terminal leads of the electric filament of light bulb 15 which are sealed through its glass neck 15–1, are connected to its terminal collar 15–2 and its central terminal 16, respectively.

In the form shown, the main cylindrical part of central contact sleeve 14 has at its upper end a circular, coaxial clamping collar 14–1 of narrower width, and with an opening large enough to permit the wider portion of the light bulb 15 to pass therethrough. The downward side of the narrow upper collar 14–1 of contact sleeve 14 is adjoined by a circular, concentric wider seating section 14–3 shaped to receive and hold fixed in position the circular metallic flange 15–4 of the light-bulb terminal collar 15–2. The seating section 14–3 of the contact sleeve 14 is adjoined by the wider axially-extending main part thereof which has at its downward end a circular laterally-projecting bottom contact flange 14–4.

The contact sleeve 14 is held insulated from the metallic casing of the flashlight. In the form shown, the reflector 13 is of insulating material and provides the insulating support for the central contact sleeve 14 which is connected through the flange of bulb terminal sleeve 15–2 to one end of the light filament (not shown) of the light bulb 15. A conventional reflector 13 is formed, as by molding, of transparent insulating resin material, and its downwardly facing main rear surface is coated with a metallic reflector film, aluminum for instance, which reflects the bulb light as a light beam through lens 13–1. The central metallic contact sleeve 14 is suitably affixed to the central inward region of the reflector 13. In the form shown, the reflector 13 is provided at its center with an uncoated, downward insulating sleeve 13–2 fitting over the upper collar 14–1 and the main circular concentric part of the contact sleeve 14, being held affixed thereto by locking engagement between the central region 14–5 of bottom contact flange 14–4 of contact sleeve 14 and the crimped-over upper collar edge 14-2 of the narrower sleeve collar 14-1.

The light bulb 15 is held detachably affixed to reflector 13 by clamping the circular collar flange 15-4 of its metallic terminal collar 15-2 within the metallic seating section 14-3 of the surrounding contact sleeve 14 by clamping sleeve 14-6 of insulating material. The clamping sleeve 14-6 may be molded of suitable synthetic resin, and its outer surface has conventional threaded engagement with the facing threads of the surrounding contact sleeve 14. The light bulb 15 may be replaced in its fixed position shown within the contact sleeve by gripping the projecting lower end of the clamping collar 14-6 and unscrewing and removing it from the contact sleeve 14 and then screwing it back in the clamping position shown after a new light bulb 15 has been placed in the shown operative position.

Figure 1:
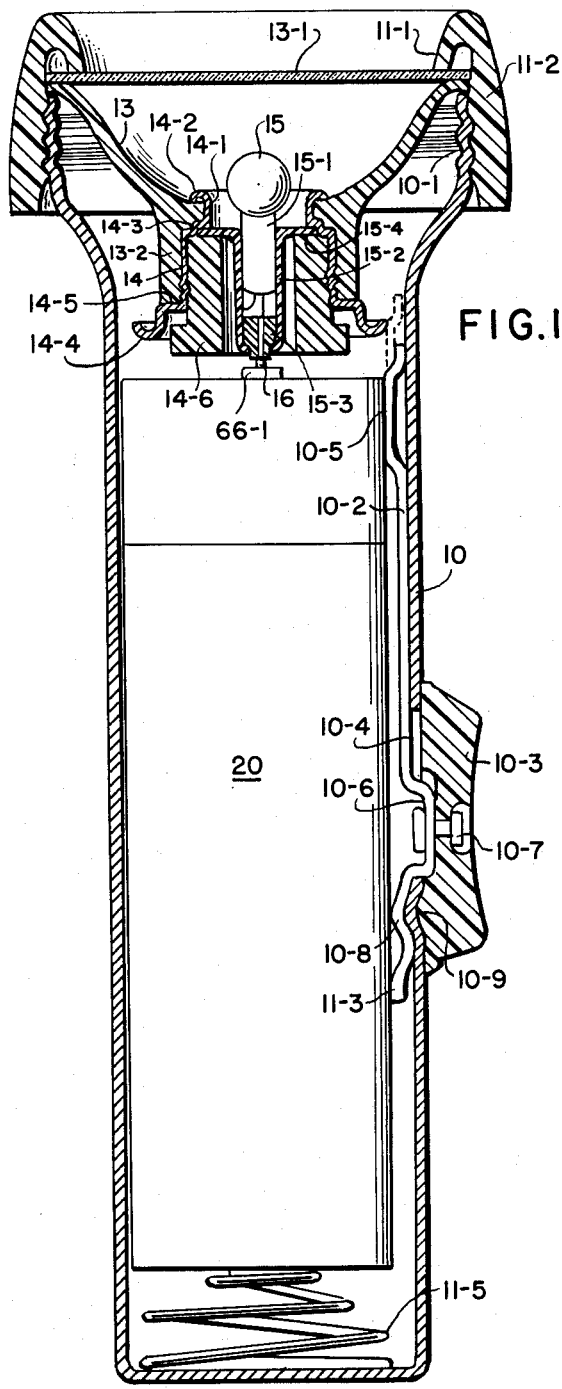
FIG. 1 is a cross-sectional view of a conventional flashlight equipped with a rechargeable battery unit exemplifying the invention.
Figure 2:
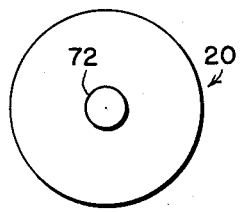
FIG. 2 is a top view of the battery unit of FIG. 1.

The casing of a conventional flashlight, of the type shown in FIG. 1, is in most cases provided with two spaced oppositely-facing flashlight terminals holding under contact pressure and electrically connecting between them an arrayed column of a plurality of cylindrical battery cells. Thus, by way of example, in the flashlight of FIG. 1, the central bulb terminal 16 forms one relatively fixed terminal of the flashlight casing 10, and the metallic bottom wall 11 of the flashlight casing with its metallic contact spring 11-5, forms the opposite relatively fixed terminal of the flashlight casing. In a conventional flashlight, a column of cylindrical, conventional dry battery cells is held under pressure in series connection between such relatively fixed opposite flashlight terminals 16 and 11.

The interior surface of lens collar 11-2 may be provided with an inward circular locking ridge projection for retaining therein the reflector 13 with the lens 13-1 together with the light bulb 15 and associated elements held fixed at the center of the reflector 13. To replace used dry cell batteries with such arrangement, the lens ring 11-2 together with the reflector 13, light bulb 15 and other elements held therein, is unscrewed and removed from the top of the flashlight casing 10, whereupon the dry cells held in the interior of the casing are dropped through the inverted open top end of the flashlight casing 10. After dropping or placing a column of fresh battery cells through the open top end into the longitudinal battery compartment of the flashlight casing 10, the lens ring 11-2 with its reflector 13 and bulb 15 are screwed back and affixed to the open upper end 10-1 of the flashlight casing 10. This establishes electric contact connections of the relatively fixed opposite flashlight casing terminals 16 and 11 with the opposite-polarity end terminals of the battery-cell column.

As in many generally used flashlight casings, the bottom end wall 11 of the flashlight casing may have a rim (not shown) by which it is threadedly connected with the threaded end portion of the adjoining side walls of the flashlight casing 10, to permit removal and replacement of a column of dry battery cells within the battery compartment of the flashlight casing 10 by unscrewing and then screwing back in place the detachable bottom end wall of such flashlight casing. In another form of conventional flashlight (not shown), the flashlight casing has a side wall which may be removed or opened for replacing used-up dry cells or a dry-cell battery assembly within the casing, by a fresh dry-cell battery assembly.

A conventional flashlight of the type shown is also provided with a switch for selectively opening and closing the circuit connections from the opposite terminals of the battery aggregate to the circuit which energizes the filament of the light bulb 15. A variety of known flashlight switches may be used for this purpose. By way of example, the switch of the flashlight of FIG. 1 has a slidable metallic switch contact member 10-2 held along an inward wall surface of the metallic flashlight casing 10 by an actuating grip or button 10-3 overlying a longitudinal opening 10-4 of the casing 10. In the form shown, movable switch contact member 10-2 is formed of a strip of electrically-conductive spring sheet metal such as a copper-base alloy used in conventional flashlight switches. The movable switch strip 10-2 has near its upper end an inwardly offset contact portion 10-5 arranged so that when the switch strip 10-2 is moved upwardly along the inward face of the underlying wall of flashlight casing 10, the offset switch contact portion 10-5 is wedged in contact engagement between the periphery of circular contact flange 14-4 of the contact sleeve 14 and the underlying metal wall of flashlight casing 10, thereby connecting the bottom end terminal of the flashlight battery 20 by way of the metal casing 10 to the filament of the light bulb 15, the filament circuit being completed by the connection of the flashlight bulb terminal 16 with the upper end terminal of the battery 20.

A guide portion 10-6 of the lower region of switch contact strip 10-2 overlying the longitudinal wall slit 10-4 of flashlight casing 10, is laterally offset in outward direction so that its side edges project through and fit within the longitudinal guide slot 10-4 of the flashlight casing for restraining the switch strip 10-2 in its upward and downward switching motion when actuated by the overlying exposed grip button 10-3. The grip button 10-3 may be made of metal, or molded of synthetic resin, as shown. The offset guide portion 10-6 of switch strip 10-2 is suitably secured, as by a rivet 10-7, to the overlying switch button 10-3. The downward end portion 10-8 of the switch strip 10-2 projecting beyond its guide section 10-6 is inwardly bent to provide a recess shaped for releasable engagement with a locking dimple 10-9 formed in the overlying wall portion of casing 10 for retaining the contact strip either in the open switching position in which it is shown, or in the closed upwardly-moved position wherein the casing dimple 10-9 engages the inwardly slightly offset contact-strip end 11-3.

As claimed in the co-pending application Serial No. 843,398, filed September 30, 1959 by I. D. Stein and assigned to the same assignee, flashlights and analogous low-power portable electric devices of the type designed for operation with a replaceable dry-cell battery, are operated with a removably-positioned rechargeable electric storage battery having two opposite battery end terminals arranged to be removably held under biasing pressure between two opposite-polarity terminals of such portable electric device, the battery unit being provided with a built-in charging circuit including a transformer, whereby it may be recharged by plugging it into the socket of a domestic power supply with all exposed metallic portions of said battery unit held insulated by the transformer from the power supply for positively protecting the user against electric shock from the higher voltage and power capacity of the power-supply when plugging and unplugging the battery unit into and from the power supply.

FIGS. 3 and 4 show partially diagrammatically and partially in cross-sectional view, a rechargeable battery unit exemplifying the invention, a substantially identical battery unit being shown in FIG. 5 in cross-section. Referring to FIGS. 3–5, the battery unit generally designated 20 constitutes an elongated, self-supporting battery structure of a length corresponding to the length of an arrayed column of a plurality of cylindrical dry cells, and arranged to be held in the cylindrical battery compartment of the flashlight casing 10 of FIG. 1, between, and under contact pressure of the upper flashlight terminal 16 and the contact spring 11-5 of the bottom flashlight terminal 11.

Within the elongated battery unit 20 is held an aggregate of a plurality of alike rechargeable battery cells 21 arrayed in a column above each other. By way of example, the battery unit of FIGS. 3–5 contains two rechargeable electric battery cells 21 shown arrayed in a vertical column above each other. Each battery cell contains at least one pair of electrode plates 22, 23 of opposite polarity, and a porous, electrically insulating separator sheet 24 extending between and separating the plates and holding electrolyte, through which electrolytic action is maintained between the electrode plates 22, 23. The superposed opposite-polarity electrode plates may be coiled or wound into a coiled electrode structure held in the cell compartment with the axis of the coiled electrode structure parallel to the major or vertical axis of the battery unit. The electrode assembly of each cell 21 is enclosed in a gas-and-liquid-tight cell casing 25, of metal for instance, having a bottom wall 26 and top wall 27, having affixed thereto an upwardly-projecting central metallic cell terminal 28 which is insulated from the surrounding region 29 of the top wall 27 by insulating barrier or loop 31 sealingly affixed to the facing surfaces of metallic terminal 28 and metallic top wall 27. However, the battery cells 21 may contain other forms of cell electrodes, such as stacked electrodes.

The electrode assembly of each cell 21 has the electrodes of one polarity connected to the insulated battery terminal 28, as shown by the connection of positive cell electrode 22 to terminal 28 (FIG. 3), and the electrodes of opposite polarity are connected to the metal wall of the casing 25, as shown by the connection of the negative cell electrode 23 to the bottom wall 26 of the metal casing 25. In the form shown, each battery cell 21 thus has two opposite-polarity metallic terminals at opposite ends thereof so that an aggregate of a plurality of such cells may be assembled as a column in superposed relation with the central terminal 28 on the top of each cell of the column making contact connection with the bottom wall electrode 26 of the next higher cell of the cell column, and thereby serially connecting all battery cells 21 of such cell column. Although the battery unit of FIG. 3 is shown as having only two cells, similar battery units may be made with a larger number of battery cells 21 arrayed in a cell column, and also with a number of such cell columns arrayed parallel to each other, with the side walls of each cell column being electrically insulated from each other.

With a flashlight battery unit 20 of the type shown in FIGS. 3–5, wherein a plurality of cylindrical battery cells 21 is arrayed in a column, above each other, the arrayed battery cells are held assembled and fixed in operative position within a battery casing 40. The battery casing 40 has a bottom end wall 41 with an opening along which the bottom wall 26 of the lowest battery cell 21 is exposed to contact engagement with the spring terminal 11–5 of the bottom casing terminal 11 of the flashlight casing of FIG. 1, when the battery unit 20 is held therein. The bottom end wall 41 of the casing 40 thus has affixed thereto the electric bottom terminal 26 of the lowest cell in the column, which bottom terminal 26 forms the bottom end-wall terminal of the generally tubular or cylindrical battery unit 20.

The battery unit 20, such as shown in FIGS. 3–5, has affixed to its top end a top end wall 66 provided with a fixed outwardly and upwardly projecting battery terminal 66–1 held insulated from the metallic casing 40 of the battery unit 20. The insulated upper battery terminal 66–1 has a metallic connector element 66–2 through which it is connected to the upper terminal 28 of the topmost battery cell 21 of the column of battery cells 21 held fixed within the battery casing 40. The battery casing 40 has also an upper casing section 42 having affixed to the upper end thereof a relatively strong, transversely-extending power terminal or coupling wall 50 (made, for instance, of molded insulating resin) within which are held insulatingly affixed two metallic power supply terminal plug-prongs 51, 52. The two outwardly-projecting power supply plug-prongs are of a thickness, height and spacing identical with the terminal plug-prongs of conventional electric power-supply plugs, which are plugged in into an electric wall socket of a domestic power supply circuit for supplying power to an electric appliance connected, as by a cord, to the plug-prongs of such plug.

In the interior casing space of the upper casing section 42 of battery casing 40, is fixedly mounted an electric power transformer 60 having a ferrous magnetic core 61 with a primary transformer winding 62 and a secondary transformer winding 63. The primary transformer winding 62 is connected between the inwardly-extending terminal end plugs 52–6 of the two outwardly-projecting power supply plug-prongs 51, 52 of the upper terminal wall 45 of battery casing 40. One end of the secondary transformer winding 63 is connected in series with rectifier means or a rectifier 64 to the upper terminal 28 of the upper cell of the column of battery cells 21 in the battery casing 40. The other or opposite end of transformer secondary winding 63 is connected to the bottom terminal 26 of the lowest battery cell 21 in the cell column, which lowest battery terminal 26 forms also the bottom end terminal of the battery unit 20.

With a battery casing 40 having its metallic bottom wall 41 in metallic contact engagement with the bottom metallic terminal wall 26 of the lowest battery cell of the aggregate or column of cells 21 in the battery unit 20, an exposed inwardly facing metallic wall portion of the upper battery casing section 42 may have affixed thereto, as by soldering or welding, a metallic terminal strip or lug 42–1 to which is connected, as by soldering, the stripped end of an insulating conductor lead from one end of the secondary transformer winding 63 which is to be connected to bottom cell wall and terminal 26 of the battery unit 20. The opposite end of the transformer secondary winding 63 is connected to one terminal of the rectifier 64, the other terminal of which is connected by serially-connected, insulated current conductors or leads 65–1, 65–2 to a metallic contact strip 28–1 which is secured, as by welding or soldering, to the insulated top terminal 28 of the upper battery cell 21 of the cell column of battery unit 20.

The battery unit 20 of the invention is so arranged that its upper end may have exposed thereon either the upper battery terminal wall 66 with its upper battery terminal 66–1 for operation in a flashlight or analogous device, or may have exposed thereon the power terminal wall 50 with its two power terminal prongs 51, 52 for recharging the battery cells from an alternating current power supply.

A battery unit 20 of the invention, such as described above in connection with FIG. 3, will operate as follows: With the upper end wall 66 locked in the upwardly-raised dash-line position 66–0, the central metallic battery terminal 66–1 is connected through and engaging metallic connectors 66–2, 53, and conductor lead 65–1, to the upper terminal 28 of the uppermost battery cell of the column of serially-connected battery cells 21 of the battery unit 20 having at its bottom end the opposite-polarity terminal 26. When placed in a flashlight, such as shown in FIG. 1, between its opposite pressure-biased flashlight terminals 16 and 11 (or between analogous terminals of another portable self-powered electric device), the opposite battery end terminals 66–1 and 26 will supply the required electric energy from the column of battery cells 21.

Upon removal of the battery unit 20 from the flashlight, it may be recharged as follows: The top end wall 66 is released or removed from the dash-line position 66–0 so as to expose at upwardly-facing power terminal wall 50 of the battery unit, the two upwardly-projecting power terminal prongs 51, 52 which are inserted into a power supply socket of a conventional domestic power supply having, for instance, a power supply voltage of 110 volts alternating current. In this condition, the power supply prongs 51, 52, supply through the primary transformer winding 62, alternating current of the required lower voltage to the secondary transformer winding 63. The rectifier 64 rectifies the alternating current in the secondary winding and supplies from it, rectified direct current or direct-current pulses of proper polarity and voltage for recharging the serially-connected battery cells 21 of the cell column in the battery unit 20. The rectifying circuit to the series of battery cells 21 is completed by the connection of the rectifier 64 through conductor leads 65-2 and 65-1 to the top cell terminal 28 of the column of battery cells, having its bottom terminal 26 connected through battery casing 40 and its terminal lug 42-1 to the opposite end of transformer secondary winding 63.

The features of the invention disclosed herein which are directed to a multi-cell rechargeable battery unit having two exposed opposite battery terminals on two opposite battery end walls—for removable positioning under pressure between two terminals of a flashlight or like device for supplying electric energy thereto—with one of the battery end walls being movable from its end position on the battery unit to another position in which the battery unit exposes at the same end, two supply terminal prongs insertible into a terminal socket of alternating current power supply for recharging the battery cells, with a built-in recharging circuit thereof, are the invention of Herbert W. Bilsky and assigned to the same assignee.

The interior surfaces of metallic battery casing 40 and its upper casing section 42 are separated by insulating coatings, or sleeves, or barriers, from the metallic side walls of all the battery cells 21. Alternatively, the metallic side walls of each battery cell may be covered or coated with a coating, or cover layer, or film of insulating material for insulating them from the surrounding metallic side walls of battery casing 40. Likewise, all metallic or conducting portions of conductors and conductor leads through which the upper battery terminal 72 is connected to the upper terminal 28 of upper battery cell 21, and through which the insulated transformer windings 62, 63 are connected to power plugs 51, 52, and to the rectifier 64, are similarly insulated from each other and from the metallic portions of the battery unit 20 and its battery cells 21, by insulating sleeves, coatings and barriers.

The transformer 60 with its windings 62, 63 is held mounted within the upper casing section 42 of the metallic battery casing 40 so that the windings and all metallically conducting parts of the transformer 60 and associated elements which are connected to the domestic power supply, are insulated from any other metallic portions of the battery unit 20. There is thereby assured that all portions of the metallic casing 40 and other metallic elements of the battery unit 20 including its exposed metallic bottom terminal wall 26, are under all conditions insulated from the electric power circuit to which the power supply plugs 51, 52 of the battery unit 20 may be connected. This arrangement eliminates the possibility of the user of such battery unit 20 being subjected to an electric shock from the electric power supply when the power supply prongs 51, 52 of the battery unit 20 are plugged in and removed therefrom when recharging the battery. When the battery unit 20 in the form shown in FIGS. 3–5, is held or placed in the flashlight housing 10 between the opposite flashlight casing terminals 16 and 11, as seen in FIG. 1, the upper end wall 66 of the battery unit is held in the dash-line position 66-0 relatively to the main casing 40 of the battery unit 20, so that the two power supply plug prongs 51, 52 extending from the top wall 45 of the battery casing 40, are enclosed by the top end wall 66 of the battery unit, with the upper battery terminal 66-1 projecting upwardly from the top end wall 66.

Suitable locking means, to be described later, are provided for locking the top end wall 66 with its top battery terminal 66-2 to the battery casing 40 in the upper dash-line operative position 66-0, shown in FIGS. 3 and 5. The top end wall 66 with the top battery terminal 66-2 of the battery unit is arranged to be unlocked and released from its fixed dash-line position 66-0, so as to expose at the upper end of the battery unit 20, the two upwardly projecting power supply plug-prongs 51, 52 projecting above casing terminal wall 45, so that the plug-prongs may be plugged in an electric socket, for thereby connecting the primary winding of the transformer to the conventional high voltage and high power capacity domestic electric power supply, and deliver through the secondary transformer windings 63, rectified direct current of proper polarity for recharging all cells of the column of battery cells 21 of the battery unit to their fully charged condition.

As shown in FIG. 3, each battery cell 21 has a metallic casing 25 having a metallic bottom wall 26 and a metallic top wall 27. The shown cell casing 25 is tubular or cylindrical in shape, although it may have oval, rectangular or other shapes. Within the top wall 27 is held a metallic cell terminal 28 which is insulated from the surrounding thicker wall region 29 of top wall 27 by a surrounding loop or ring-shaped insulating member 31. The insulating member is of fully dense, solid, inorganic, gas-tight insulating material such as glass or ceramic materials of the type used in making evacuated gas-tight amplifier tubes. The top wall 27 of each cell is shown having an upwardly bent rim edge 32 shaped to fit within the upper edge of the cylindrical cell casing 25. The insulating loop 31 is joined by fusion at elevated temperature, to the outer surface of the surrounded metallic terminal member 28 and to the surrounding surface of the thicker central wall portion 29 of metallic top wall 27, by fusion at elevated temperature at which the solid material of the insulating loop fuses to the facing surface portions of the two adjoining metallic structures 28 and 27. After assembly of the cell components, the rim edge 32 of the metallic top wall 27 and the upper edge of the tubular cell casing 25 are likewise joined to each other by fusion at elevated temperature at which the adjoining wall edge portions melt and fuse into an integral gas-tight metallic structure. Such fusion-sealed, rechargeable battery cell is the subject-matter of to co-pending application Serial No. 843,402, filed September 30, 1959, by L. Belove.

Without thereby limiting this phase of the invention, there will be given below, data of a practical battery cell having such hermetically tight cell casing with the insulated terminal and all wall portions of the casing joined to each other by fusion into a tight, fused, integral cell casing structure. The cell casing 25 and its top wall 27 are formed of cold-rolled steel and thereafter plated or coated with an adhering coating of nickel, since each battery cell is designed for operation with nickel-cadmium electrodes, for instance of the type described in Koren et al. Patent 2,708,212. The central terminal member is formed of a nickel-iron alloy containing 50% nickel and 50% iron. The inorganic insulating loop 31 is formed of gas-tight borosilicate glass, such as known in the trade as "Corning 9010," which has a melting temperature below 1000° C. Before fusing the insulating loop 31 to the metallic members 27, 28, they are oxidized by heating them within an oxidizing atmosphere.

The terminal member 28 is then assembled with the surrounding glass insulating member 31 within the opening of the cell top wall 27 in a suitable jig, for instance of graphite. This top wall assembly is then passed with the jig through an oven wherein it is heated to a temperature at which the glass of the insulating junction loop 31 fuses with the facing oxidized surfaces of the terminal member 28 and top wall member 27, thereby forming an integral top wall having an electrically insulating, gas-tight, hermetically fused sealing junction 31 between the main body of metallic cell top wall 27 and its metallic terminal 28. The oxide coating previously formed on the metallic cell top wall 27 and its metallic terminal member 28, is then removed from the remaining major exposed surfaces thereof by a suitable treatment, for instance by a treatment with hydrochloric acid, leaving the cell top wall 27 and its terminal member 28 with a clean exterior metallic surface.

The coiled, sintered electrode assembly with its insulating separators is then positioned within the cell casing 25. Before assembling and coiling them, the opposite-polarity electrodes 22, 23 are provided with outwardly-projecting metallic electrode tabs, of flexible nickel sheet, for instance, the inner ends of which are welded to edge regions of the respective electrode plates so that the coiled electrode assembly has an upwardly-extending terminal tab 22–1 from the positive cell electrodes 22, and a downwardly-extending terminal tab 23–1 from the negative cell electrodes 23. After positioning the electrode assembly within the cell casing 25, the end of the downwardly-extending electrode tab 23–1 is welded to the central region of the cell casing bottom wall 26, and its upwardly-projecting electrode tab 22–1 is similarly welded to the inwardly-facing surface portion of upper metallic terminal member 28. Alkaline electrolyte is then poured into the cell so as to fill the pores of the separators 24, and the capillary electrode spacing between them, with the electrolyte. Thereupon the cell casing top wall 27 is placed or fitted between the upward edges of the tubular or cylindrical walls of cell casing 25 so that the upwardly projecting edge rim of the top casing wall 27 is substantially at the same level as the surrounding edge of the side walls of cell casing 25, being held therein by their interfitting contact engagement. Thereupon, the upwardly-facing fitting, upwardly extending edges of the rim of the cell top wall 27 of the side walls of cell casing 25, are molten and fused to each other into a tight, integral metallic casing structure, with the metallic top wall 27 and the main cell casing 25 fused into a continuous, integral metallic structure. To prevent loss of electrolyte when fusing at elevated temperature, the interfitting junction edges of the casing 25 and top wall 27, the cell casing assembly is held seated within the opening of a massive metallic jig engaging and surrounding the upper region of the cell casing 40 underlying its upper edge, which metallic jig is cooled, for instance, by circulating through it a cooling liquid such as water, or evaporating thereon the cooling liquid while the interfitting upper edges of the cell casing 25 and its top wall 27 are fused to each other. In practice, good results are obtained by rotating the jig with the cell casing assembly held therein, and maintaining a constricted, pencil-like torch arc in a protective gaseous medium such as helium or argon, between the tip of an arc electrode and an adjacent edge portion of the rotating edge of the cell casing assembly, for instance by a constricted torch-arc apparatus as described in Oyler et al. Patent 2,884,510, and the literature describing commercial torch arc apparatus of this type.

The metallic casing 25 and metallic terminal 28 may be formed of any metal which resists corrosion when continuously subjected to alkaline electrolyte, such as stainless steel, nickel and the like. However, the casing and the terminal may also be formed of other metals provided all exterior surfaces of such metal casing and terminal which are exposed to the electrolyte, are coated with a continuous, adhering metal coating of metal which resists corrosion by alkaline electrolyte.

As stated before, the metal of the cell casing 25 and of the casing top wall 27 are of conventional cold-rolled steel which has been plated with an adhering nickel coating. In practice, after first forming the cell casing 25 and its top wall 27 in the desired final form, such as shown in FIG. 3, a large quantity of such casing parts are nickel-plated in a conventional nickel-plating bath. In such conventional nickel-plating process the edges of the steel casing 25 and of the steel cover 27 have electrodeposited thereon a much thicker or higher deposit of nickel than is deposited along the other surface portions of the so-plated casing parts. When forming the fused weld joint 32, between the interfitting upward edges of the cell casing 25 and its top wall 27, the larger amount of nickel previously electrodeposited on the fused edges, diffuses in the molten steel of the fused casing edge portions, thereby enriching the fused steel edges 32 of each cell casing with nickel and providing each fused casing edge 32 with the desired protection against oxidation. There is thus obtained a hermetically sealed, rechargeable alkaline battery cell wherein the electrode assembly and corrosive electrolyte are hermetically enclosed in a gas-tight, integral, metallic casing having at least one metallic electrode which is insulatingly joined by fusion of an insulating sealing junction loop of high-density, inorganic material at elevated temperature, to the casing and terminal portions which it joins, with the casing having two or more complementary casing sections for enabling the electrode assembly to be assembled therein, the junction portions of complementary casing parts being joined by fusion at an elevated fusion temperature to provide a hermetically sealed cell casing, all joints of which are sealed by fusion.

There will now be further described, features which are the sole invention of Herbert W. Bilsky, and which comprise a rechargeable battery unit having two exposed opposite battery terminals on two opposite battery end walls of the type required in flashlight and analogous devices, with one of the battery end walls and its battery terminal being movable from its end position on the battery unit, to another position in which the same end of the battery unit has exposed thereon two power supply terminal prongs insertable into an alternating-current power supply socket for recharging the battery cell, with a built-in rectifier in the recharging circuit. FIGS. 3 through 5 show one form, and FIGS. 6, 7 and 8 show further forms of this phase of the invention disclosed herein.

Referring to the diagrammatic view of FIG. 3, and the structural views of FIGS. 4 and 5, showing one form of the last-referred-to invention, the battery unit 20 has, as described above, an upper battery terminal wall 66 insulatingly holding thereon the upper battery terminal 66–1. The battery terminal wall 66 is movable from the dash-line output position 66–0 in which it delivers power to a flashlight or analogous portable device, to the full-line input position 66 in which it is shown and in which position it is plugged in into the power supply socket for recharging its battery cells. This movable upper battery terminal end wall 66 may form an integral part of a tubular or cylindrical casing section 66–3 shaped to movably or slidably fit over the exterior of the tubular or cylindrical upper casing section 42 of the battery casing 40. The movable upper battery terminal wall 66 has two slots 66–4 which fit movably over the two power supply plugs 51 and 52 when this terminal wall 66 is moved between its dash-line, power-supply position 60–0, and its full-line cell-recharging position. The movable battery terminal end wall 66 has also means cooperating with wall portions of battery casing 40 for interlocking and holding fixed the battery terminal end wall 66 to the casing either in the raised dash-line power output position 66–0, or in the retracted full-line battery recharging or input position. FIGS. 3–5 show one form of releasable locking arrangement between the battery casing and such movable battery terminal end wall.

The tubular movable upper terminal casing section 66–3 has formed on the exterior thereof a generally circular or arcuate seating recess 66–5 within which is seated an arcuate or circular locking strip 66–6 of spring sheet metal. The locking spring 66–6 has an inwardly bent fixed spring end 66–7 (FIG. 5) shaped to fit and be secured as by cement within a mounting slit of the casing section 66–3. Near its opposite end, locking strip 66–6 has a stiff locking tongue 66–8 projecting from a strip-edge thereof into inward locking engagement with a locking slit 42–1 of the upper casing section 42 for thereby locking the movable upper terminal end wall 66 in the full-line retracted position shown in FIGS. 3 and 5, wherein the two power supply plugs 51, 52 project outwardly for insertion into a conventional alternating-current power supply socket.

A side wall portion of the upper end wall casing section 66-3 along which the free end 66-9 (FIG. 5) of the locking strip 66-6 is exposed, has a deeper recess 67-1 for exposing the free locking strip end 66-9 so that it may be gripped by a finger for lifting the locking tongue 66-8 thereof from the position in which it is seen in FIGS. 3 to 5, until the inward end of its locking tongue 66-8 is released from its engagement with lower locking slit 42-1 of the upper battery casing section 42. After thus lifting the locking tongue 66-8 of locking strip 66-3 from its engagement with the lower casing locking slit 42-1 of battery casing section 42, the upper terminal end wall 66 with its casing section 66-3 may be slid along the exterior of upper battery casing section 42 until the locking tongue 66-8 of locking strip 66-6 reaches the upper locking slit 42-2 of the upper casing section 42, whereupon the strip-locking tongue 66-8 automatically drops and enters into interlocking engagement with its upper locking slit 42-2 of the upper casing section 42, thereby locking the movable upper casing section 66-3 with its terminal end wall 66 in the dash-line, power-delivery or output position 66-0. The elastic restoring forces of the lifted locking spring are sufficiently large to assure automatic return of locking tongue 66-8 either into the lower locking slit 42-1 or into the upper locking slit 42-2 of the upper battery casing section 42, for selectively locking the upper battery terminal end wall 66 with its upper battery terminal 66-1 either in the raised dash-line position 66-0, or in the retracted full-line position in which it is shown in FIGS. 3 and 4.

Referring to FIGS. 3-5, the upper power-output battery terminal end wall 66 is movably positioned above the underlying upper power-input or recharging terminal wall 50. The upper power-input terminal wall 50 is arranged to be held fixed in the upper end of the upper casing section 42 between a reentrant peripheral clamping ridge thereof and the upper edge end region of upper battery casing section 42, which is crimped-over on upwardly facing border regions of the insulating power-input coupling or wall 50. In a central or intermediate portion of the upper power-input terminal wall 50 of the battery unit, is held affixed the upper end 53-1 of a metallic contactor sleeve 53 extending therefrom into the interior space of the other upper battery casing section 42. Within the contactor sleeve 53 is slidably positioned a relatively elongated, thin, though stiff, metallic contactor member 66-2 the upper end of which is affixed to or forms part of the upper battery terminal 66-1, which is fixed within the movable upper battery terminal end wall 66.

The contactor member 66-2 is arranged to maintain contact engagement with the facing surface portions of the metallic contactor sleeve 53 while the upper movable battery terminal end wall 66 with its metal terminal 66-1 are moved or slid from the inward full-line, power-input position shown, to the outer dash-line, power-output position 66-0, wherein upper battery terminal member 66-1 forms a fixed part of the battery unit 20 as it is placed within a flashlight casing or analogous electric device for delivering battery power to the operating circuits of such device.

The elongated terminal member 66-2 may be formed of a relatively stiff metallic elastic wire or ribbon of good electric conductivity, which is deformed along its length into a slightly wavy or crinkled shape, so that when it is moved through the contactor sleeve 53, good electrical contact engagement will be assured between them in all their contacting positions. The lowest end of such stiff wire-or-ribbon contactor rod 66-2 is straight, so that it will automatically enter the wider upper mouth end 53-1 of the contactor sleeve 53 when the battery end wall 66 is brought into its operative position over the upper casing section 42 from the top thereof to the full-line position shown in FIGS. 3 and 4. Alternatively, as shown in FIG. 3, the contactor sleeve 53 may be provided with an internally crimped portion 53-2 shaped to engage the exterior surface of a straight contactor rod 66-2 of the movable upper battery terminal member 66-1 of the battery unit, as it is moved between the full-line battery cell recharging position and the dash-line, power-output position 66-0.

FIG. 4 also shows, by way of example, one way of mounting the transformer 60 within the battery casing 40. Referring to FIG. 4, the transformer 60 is of a known type, having a central magnetic core leg which is surrounded by the two interlinked transformer windings 62, 63, with two outer core legs joining on opposite sides the two ends of the central core leg and surrounding the transformer windings along its opposite outer surfaces. The outer shape of the magnetic core is generally rectangular, and its exterior core legs are held fixed between opposite lateral, inward projections 50-1 of the upper input terminal wall 50 and the lower-positioned side walls of a loop-shaped or cylindrical spacer member or ring 54-1. The spacer ring 54-1 is held fixed against the inward circular casing shoulder through which the wider main lower battery casing 40 is joined to the upper somewhat less wide casing section 42.

The loop-shaped spacer ring 54-1 is relatively thick, and is made of elastic, rubber-like insulating material, and has a central opening for receiving therein the upwardly projecting upper cell terminal 28 of the upper battery cell 21 of the cell column of the battery unit 20. The column of similar battery cells assembled in series relation one under the other, as shown diagrammatically in FIG. 3, is held fixed within the space of the main battery casing 40 by being compressed under peened-over bottom edges 41-2 of the metallic battery casing 40, while the column of battery cells 21 is held compressed under the elastic restoring forces of the compressed, rubber-like cell spacer 41-4. On completing the peening of the bottom casing edge 41-2, the elastic restoring forces of the released, rubber-like thick spacer 41-4 holds all battery cells 21 of the cell column under compression in their properly fixed, aligned operative position within the casing 40.

The side walls of the metallic battery casing 40 are shown insulated by an inner tubular-shaped insulating spacer member or coating 41-5 from the surrounded metallic side walls of the individual cell casings 25. In addition, the metallic top casing wall 27 of each battery cell 21 underlying the top cell of the cell column of the battery unit 20, is separated from the metallic bottom terminal wall 26 of the overlying battery cell 21, by an insulating washer 41-6 of suitable insulating material, for instance of suitable electrically-insulating, synthetic-resin sheet material. Each such insulating washer 41-6 has a central opening through which the central metallic terminal 28 of the underlying battery cell 21 projects into and maintains contact engagement with the metallic bottom casing terminal wall 26 of the overlying battery cell 21 of the cell column.

All exterior surfaces of the side walls of the metallic battery casing 40 are also covered or coated with an insulating layer or coating 41-7 so as to prevent metallic conducting engagement between the side walls and metallic cell casing 25 and the metallic walls of a surrounding casing, such as a flashlight 10 in which the battery unit 20 is positioned for delivering energy to its operating circuits. The exterior insulating coating 41-7 and also its interior insulating coating 41-5 may be applied to the metallic battery casing 40 by spraying with or dipping in a suitable solution of insulating synthetic resin material, followed by drying; or by cementing a thin sheet of insulating resin material to the opposite surfaces of the side walls of battery casing 40. Alternatively, the side walls of each cell casing may be covered or coated with an adhering insulating synthetic resin coating, in which case the interior insulating coating 41–5 of the casing 40 may be omitted.

In some applications, it is important to maintain the metal casing 40 of the battery unit 20 insulated from the metallic portions and terminals of each of the columns of battery cells 21 and also from any metallic circuit and connector portions through which the battery cells 21 are connected to the upper battery output terminal 72 of the battery unit, and through which the power supply or input plugs 51, 52 are connected to the transformer 60 and its rectifying battery-charging circuit. FIG. 4 shows how the substantially identical battery unit 20 shown diagrammatically in FIG. 3, may be modified to assure such insulation of the metallic battery casing 40 from all other conducting portions of the battery unit through which it is connected to the flashlight or analogous portable device, for supplying electric energy thereto or through which it is connected to an alternating-current power circuit for supplying recharging direct current to its column of battery cells.

As described above, the side walls of the metallic battery casing 40 of FIG. 4, which is identical with that shown in FIG. 3, are provided on their interior and exterior surfaces with insulating coating layers or separators 41–5, 41–7, respectively, of synthetic resin material. In distinction from the arrangement shown in FIG. 3, the metallic bottom wall 26 of the lowermost battery cell of the column of cells of battery unit 20 of FIG. 4, is electrically insulated by an insulating washer 43–1 from the peened-over, inturned metallic bottom casing flange 41–2 which holds the cell column in position with the metallic casing 40. The bottom insulating washer 43–1 has a central opening through which the metallic bottom terminal wall 26 of the lowest battery cell of the cell column held in casing 40, is exposed to contact engagement with the spring contact 11–5 of the metallic bottom casing terminal 11 of the flashlight casing 10 or of a similar electric device. To protect the insulating washer 43–1 underlying the bottom terminal wall 26 of the lowest battery cell 21 within the battery casing 40 from damage when peening thereover the bottom flange 41–2 of the metallic battery casing 40, a strong metallic washer 43–2 is placed over the bottom surface of the insulating washer 43–1 before the bottom flange 41–2 of the metallic battery casing 40 is peened over it.

In the battery unit of FIG. 4, instead of connecting one end of the secondary transformer winding 63 directly to the metallic battery casing 40 and therethrough to the metallic bottom casing terminal 26 of the bottom cell 21 of the battery unit 20, this end of the secondary transformer winding is connected to the metallic casing 25 of the bottom cell 21 of the cell column, through a metallic connector 41–7 which is insulated from the metallic casing 40 of the battery unit 20 and from the metallic casing walls 25 of each of the cells 21 of the cell column of the battery unit 20. The metallic connector 41–7 may be formed of a thin metal conductor strip which is affixed, as by cementing, to the inner insulating coating or separator 41–5 of the main metallic battery casing 40, and is covered on its interior surface facing the cell casings 25, by a protective cover film 41–8 of strong insulating material.

The upper end 41–9 of the insulatingly-covered metallic connector strip 41–7 is free from its insulating cover 41–8 and is exposed for connecting thereto the stripped conductor end of the secondary transformer winding 63 which is shown in FIG. 3 connected through casing lug 42–1 to the battery casing 40 thereof. The bottom end 41–10 of the metallic connector strip 41–7 is likewise free of its insulating cover 41–8 and is held in metallic contact engagement with a portion of the metallic bottom casing wall 26 or side casing wall 25 of the bottom cell 21 of the cell column of the battery unit 20. With the bottom metallic wall 26 of the lowest battery cell 21 held biased under pressure by the peened-over bottom flange 41–2 of the metallic battery casing 40 of FIG. 4, the metallic casing 25 of the bottom cell 21 of the cell column will maintain positive and good contact engagement with the exposed metallic bottom end 41–10 of the insulated metallic connector strip 41–6, the uncovered top end 41–9 of which completes the connection to the secondary transformer winding 63 in the same way as the metallic casing lug 42–1 completes such transformer connection in the arrangement of FIG. 3.

Otherwise, the battery unit of FIG. 4 is identical with that of FIG. 3, except for the more detailed showing of the mounting of the power input terminals 51, 52 in the upper power input terminal wall 50 of the battery unit 20.

Referring to FIG. 4, the power input terminal wall 50 of the battery unit 20 holds affixed therein two alike, upwardly-projecting input terminal prongs 51, 52 which are formed in a conventional way of doubled-over metallic conductor strips of spring-like conductive sheet metal of the type generally used for similar power-supply plug-prongs. One arm 52–3 of each terminal prong 51, 52, has a laterally bent arm section 52–5 shaped to fit within a shallow, downwardly-facing seating recess of the overlying portion of terminal wall 50, and merges into a downwardly-projecting terminal lug 52–6, to which the respective opposite ends of the primary transformer winding 62 are connected in the manner shown diagrammatically in FIG. 3. The other doubled-over arm 52–4 of each terminal prong 51, 52, has a slightly curved end portion 52–7 shaped so that when the respective power supply terminal prong 51, 52 is inserted into its respective wall slit 51–3 of the power input terminal wall 50, the curved arm-end 52–7 of each terminal prong 51, 52, and the adjacent inward portions of each doubled-over arm of each terminal prong 52, 52, will be forced apart into tight frictional holding engagement with the facing casing wall surfaces of the seating slit 51–3 of the power input terminal wall 50 in which they are seated. The two seating slits 51–3 for the two power input prongs 51, 52 of the power input terminal wall 50, also each have a locking recess 51–4 into which a struck-out locking tongue 52–8 of each prong arm 52–3 enters when the respective power supply prong 51, 52 is inserted into the respective wall seating slit 51–3 from the under side of input terminal wall 50, as seen in FIG. 4. With the arrangement shown, the doubled-over prong strips 52–3, 52–4 of each of the two power supply prongs 51, 52, are inserted into the respective wall seat slit 51–3 of the power input terminal wall 50 from the under side of the seating slit 51–3, as seen in FIG. 4, until the struck-out locking prong 52–8 of prong arm 52–3 of each power input prong 51, 52 reaches the locking slit recess 51–4, whereupon it is interlocked with the lower transverse wall thereof, thereby fixing the respective power input prong 51, 52 in its seating slit 51–3 of the insulating power input terminal wall 50.

FIG. 6 is a cross-sectional view similar to FIGS. 3 and 4, of another form of rechargeable battery unit of the invention for use in flashlights and in other generally analogous applications. As in the previously described battery units, that of FIG. 6 has a battery structure which forms the principal part thereof, and is enclosed in a casing 71 which is shown as consisting of a generally tubular or cylindrical metallic casing structure. However, as in the case of the other herein described battery units, the casing 71 of the battery unit of FIG. 6 may be formed of synthetic resin. Within the casing 71 of the battery unit is held an aggregate or column of battery cells 21. The battery unit has at one or the bottom end thereof, one battery terminal 26, and at its opposite or top end an opposite battery terminal 73–1 arranged to be held under contact in a tubular battery compartment of a flashlight casing, such as shown in FIG. 1, between the upper and bottom flashlight terminals of the flashlight casing. As in the other battery units herein described, the battery cell aggregate of FIG. 6 may contain any number of similar battery cells 21 or only a single battery cell. In the form shown in FIG. 6, the lower battery terminal 26 is formed by the exposed bottom wall 26 of the metallic casing 25 of the bottom battery cell 21. The individual battery cells 21 and their arrangement within the battery casing 71 of FIG. 6, are identical with those described in connection with FIGS. 3 and 4, and need not be further explained.

The upper metallic battery terminal 73–1 is held fixed in a movable upper terminal end wall 73 of the battery unit of FIG. 6, which is of insulating material such as a suitable, known synthetic resin. Underlying the movable upper terminal end wall 73, is a power input or coupling end wall 72 which is affixed to the upper end of the battery casing 71 and forms the upper casing wall of the battery structure. The upper metallic battery terminal 73–1 projects above the upper level of its movable end wall 73, and it has an inwardly-projecting, elongated metallic connector plug or member 73–6 arranged for detachable coupling with a cooperating connector sleeve or member 72–6 held affixed in the coupling wall 72 of the battery structure, and through which the upper battery terminal 73–1 is connected to the upper terminal 28 of the topmost battery cell 21 of the column of battery cells held fixed within the battery casing 71. Within the upper coupling end wall 72 of the battery structure, are held fixed two outwardly-projecting power terminal plugs 51, 52 with which the battery structure is connected to a domestic electric power supply circuit for supplying charging current and recharging the battery cells 21.

In the form shown, the plug or connector member 73–6 which projects inwardly from the battery terminal 73–1 of the upper movable terminal wall 73, is made in the form of a connector pin arranged to slide into contact engagement with the metallic coupling or connector sleeve 76 held fixed within the coupling wall 72 of the battery structure 70. The connector sleeve 72–6 is of conventional shape, and has split upper wall portions of spring metal which are elastically biased into contact engagement with the terminal connector pin 73–6 of the movable upper terminal wall 73 of the battery unit. The coupling wall 72 has slits 72–3 with locking recesses 72–4 for holding fixed and locked therein the two upwardly-projecting power terminal plugs 51, 52, for instance in the manner described in connection with FIG. 4.

The movable upper terminal end wall 73 forms part of a tubular or cylindrical casing section 73–2 providing a compartment which encloses the upwardly-projecting power terminal plugs 51, 52 of the casing coupling wall 72 and is arranged to be detachably affixed to the underlying coupling end wall 72 of the battery structure casing 71. In the form shown, the coupling end wall 72 of the battery casing 71 has an upward wall section with helical threads 72–5 shaped for threaded engagement with corresponding threads on the facing inward surface of the lower part of the surrounding casing section 73–2 of the movable terminal end wall 73 and thereby joining them into the complete battery unit 20.

Within the upper compartment of the battery casing 71 underlying the coupling end wall 72 thereof, is mounted and housed the transformer 61 and the circuit portions of the charging circuit whereby the two power plug terminals 51, 52 are connected through the transformer and the rectifying charging circuit including rectifier 64, to the serially-connected battery cells 21 for recharging them in the way described in connection with FIGS. 3 and 4, when the two exposed power input plugs 51, 52 of the battery structure 70 are plugged in into a wall socket of a domestic power supply circuit after first removing the movable terminal end wall 73 with its upwardly projecting battery terminal 72–1 from its threaded engagement with the coupling end wall 72 of the battery structure.

The transformer 60 is held fixed in the upper compartment of battery casing 71 by engagement of its magnetic core 61 with the underlying surface portions of the rubber spacing washer 41–4 separating it from the upper battery cell 21 and the loop-shaped or circular upper spacing member 72–7 held wedged between upper face portions of transformer core 61 and downwardly-projecting shoulder portions 72–8 of the inwardly-facing wall surface of coupling end wall 72 of the battery casing 71. The column of battery cells with the transformer 60 and the spacing loops or rings 41–4, 72–7, are held fixed in assembled position within the battery casing 71 under the biasing pressure of the compressed rubber spacing ring 71–4 between the peened-over lower flange 71–2 of the battery casing 71 and the peened-over upper edge 71–3 of the metallic casing 71 which overlies a slightly wider bottom section 72–1 of the coupling wall 72 of the battery structure. Otherwise, the battery unit of FIG. 6 is identical with that described above in connection with FIGS. 3 and 4.

The battery casing, such as the metallic battery casing 75 of FIG. 6, and the similar casing of the other battery units described herein, may have a solid metallic bottom wall underlying the solid metallic bottom wall 26 of the bottom cell 21 of the column of battery cells held in the respective battery casing, with the solid metallic bottom wall of the casing making direct contact with the metallic bottom wall 26 of the bottom cell enclosed therein or being connected thereto through a suitable metallic connector means.

FIG. 7 is a cross-sectional view similar to FIGS. 3, 4 and 6, of another form of rechargeable battery unit of the invention for flashlights and other generally analogous applications. As in the other herein described battery units, that of FIG. 7 has a battery structure forming the principal part thereof, and held enclosed in a casing 75. The casing 75 shown, may be of tubular or cylindrical shape, and of metal, as in the other herein described battery units, although it may be formed of synthetic resin. Within the metallic casing 75 are housed a column of battery cells 21, and an input transformer 60 having a magnetic core 61, a primary winding 62, and a secondary winding 63, including a rectifier 64, for charging the serially-connected column of battery cells 21 from a domestic electric power supply circuit, as in the other battery units. The arrangement and connections of the battery cells 21 and the transformer and charging circuits of the battery unit of FIG. 7, conform generally to the arrangement and connections of the similar elements shown in FIG. 3, although they may be modified to conform to the arrangement and connections shown and described in connection with in FIGS. 3, 4 and 6. The lower terminal of the battery unit of FIG. 7 is formed by the exposed metallic casing bottom wall 26 of the lowermost cell 21 of the column of battery cells 21 held enclosed in casing 75. The battery unit of FIG. 7 has detachably affixed thereto a movable upper terminal wall 77, for instance of insulating material such as synthetic resin, holding affixed therein a central battery metallic output terminal 77–1 projecting above the upper surface thereof and connected to the upper battery cell 21 of the battery unit, so that the battery unit may be placed with its two opposite end terminals 26 and 77–1 under contact pressure between the cooperating opposite terminals of a flashlight casing, for supplying electric power thereto, as described in connection with FIG. 1, or for supplying battery power to a generally analogous other electric device.

Underlying the upper movable terminal wall 77 is a coupling end wall 76 of the underlying main battery structure and forming the upper casing wall of its battery casing 75. The central upper battery output terminal 77–1 of the movable terminal wall 77 of the battery unit, is shown formed of a hollow, sleevelike metallic structure held fixed within the surrounding insulating body of the movable terminal wall 77. An interior part of the sleevelike metallic terminal member 77–1 of the movable terminal wall 77 has one or more contact portions 77–3 arranged to establish sliding contact engagement with a cooperating generally plug-shaped or plug-like contact member 76–5 held fixed in and projecting upwardly or outwardly from the insulating coupling wall member 76 of the battery casing 75.

The plug-like contact member 76–5 of the battery coupling wall 76 may be formed of a hollow, sleevelike structure of elastic metal with the upwardly-projecting portion slit so that its slit elastic metallic portions are deformed and biased to maintain good contact engagement with the facing, surrounding contact portions of the metallic contact sleeve 77–3 of the terminal member 77–1 of the movable terminal wall 77. The downward portion of the plug-like contact member 76–5 is held suitably fixed within the central region of the casing coupling wall 76. In the form shown, the part of the contact member 76–5 which is held in the casing-coupling wall 76, is provided at opposite metallic wall portions thereof with outwardly bent elastic locking tongues 76–6 shaped and biased to establish locking engagement with locking recesses 76–7 of the coupling wall opening through which it passes, and another set of oppositely-acting outwardly-bent locking tongues 76–8 engaging the inwardly-facing wall surface of coupling wall 76 in which coupling pin 76–5 is affixed.

In accordance with a phase of the invention exemplified in FIG. 7, the movable terminal wall 77 carries thereon not only the battery output terminal 77–1 for supplying energy to a load, but also two power-input plug terminals 77–5 corresponding to the two recharging power-input plug terminals 51, 52 of FIGS. 3, 4 and 6, so that by coupling the terminal wall 77 in different 180-degree displaced positions to the coupling wall 76 of the battery casing 75, there are selectively exposed at one (or the upper) end of the battery unit of FIG. 7, either the battery power output terminal 77–1 through which battery power is supplied to a device operated thereby, or the two power-input plugs 77–5, by means of which the battery unit is plugged in into a socket of a domestic power supply for recharging the battery cells 21 of the battery unit.

In the form shown in FIG. 7, each elongated power supply plug 77–5 is formed in a conventional way of doubled-over strips of spring-like sheet metal of the type generally used for similar power supply plugs, with an affixed portion of each plug 77–5 held within a slit opening 77–6 of the coupling of terminal wall 77. One strip arm 77–7 of each power input plug 77–5 projecting outwardly from one wall surface of terminal end wall 77 has an inward arm portion which after passing through the seating slit 77–6 of terminal wall 77, is laterally and reversely bent along the opposite wall surface of terminal wall 77 and terminates in a reentrant, generally parallel contact strip arm 77–9 extending through a coupling slit opening 78–1 of the terminal end wall 77. A struck-out locking tongue 77–8 of strip arm 77–7 of each input plug is elastically held in locking engagement in a locking recess of the slit 76–6 of the terminal wall 77 for holding together with its reversely-bent strip arm each input plug 77–5 affixed in its operative position shown within the terminal end wall 77.

The terminal end wall 77 and its two power input plugs 77–5 projecting outwardly from one wall surface thereof are so arranged that when the terminal wall 77 is removed from the shown full-line coupling connection with the battery-casing coupling wall 76 shown in FIG. 7, and after turning the so-removed terminal wall 180 degrees to the reversed position indicated by the dash-line positions of its power input plugs 77–5, the coupling wall 77 may be moved back in such 180-degree turned or reversed position into coupling engagement with the casing coupling wall 76, wherein the reentrant inward contact terminal end arms 77–9 of each upwardly-projecting power-input plug 77–5 are engaged by a respective cooperating outwardly-projecting coupling plug 78–2 held fixed in and extending upwardly from the upper or outer wall surface of the casing coupling wall 76, as seen in FIG. 7. Each of the two outwardly-projecting coupling plugs 78–2 of the casing coupling wall 76 may be of any suitable construction, and each is shown formed of a bent-over metallic spring contact strip similar in general construction to the two power input plugs 77–5 described above. Each coupling plug 78–2 has strip arms 78–3 and 78–7 passing through and held fixed within a slit opening 78–4 of casing coupling wall 76.

The inward end of the strip arm 78–3 of each coupling plug 78–2 of the casing coupling wall 76 is adjoined at its inward end by a laterally-bent locking portion 78–5 overlying the inner wall surface of casing coupling wall 76 and terminating in a connector lug 78–6 to which one end of the transformer winding 62 is connected, respectively. The other strip arm 78–7 of each coupling plug 78–2 has a struck-out locking tongue 78–8 shaped for engagement with a locking recess of its wall mounting slit 78–4 so that the locking tongue 78–8 together with the laterally-bent locking portion 78–5 of each coupling plug 78–2 holds the respective coupling plug 78–2 fixed and locked within the respective mounting slit or opening of casing coupling wall 76.

The outer part of the strip arm 78–3 of each coupling plug 78–2 and the facing outer part of the strip contact arm 77–9 of each power input plug 77–5 engaged thereby, are provided with shaped, cooperating locking bulges and recesses, respectively, shaped so that when the movable terminal wall 77 is brought with either one of its two upwardly and downwardly facing coupling wall surfaces shown, into coupling engagement with the upwardly facing coupling surface of casing coupling wall 76, the bulging and recessed strip arm portions of each coupling plug member 78–2 of coupling wall 77 will interlockingly engage corresponding bulging and recessed locking portions of the facing strip arm 77–9 of the associated respective terminal plug 77–5 of terminal wall 77. This assures that the coupling wall will remain locked to the casing coupling wall 76 of the battery casing 75 in each of its two reversely-turned coupling positions, namely either in its terminal wall position in which its central battery output terminal member 77–1 projects upwardly, as seen in FIG. 7, for insertion into coupling engagement with associated opposite terminals of a flashlight or similar device which is supplied and energized by the battery unit; or in its 180-degree reversed position in which its two power input plugs 77–5 project upwardly therefrom for plugging in into a socket of a domestic electric power supply circuit for recharging the battery.

The facing surfaces of the metallic sleeve of central battery-output terminal member 77–1 of movable terminal wall 77 and the cooperating facing portions of central terminal plug 76–5 of casing coupling wall 76, are likewise provided with cooperating locking bulges and locking recesses arranged for interlocking engagement, for additionally holding the terminal wall 77 interlocked in the coupled position to the casing coupling wall 76 in each of the two opposite 180-degree reversed coupling connections of the terminal wall 77. Furthermore, or alternatively, the mutually interlocked respective metallic terminal portions of the terminal members 77–5 and 77–1 of the movable terminal wall 77 and of the cooperating metallic connector and coupling members 78–2 and 76–5 of casing coupling wall 76, may be provided with locking hooks and locking recess portions arranged in a manner similar to corresponding locking-hook and locking-recess portions of conventional plug and socket power connectors of domestic power supply circuits, whereby the power plug may be held interlocked with the power supply socket by relative turning motion between them, whereby their locking hooks and recesses are interlocked for retaining them in locked position, from which they may be released by turning them in opposite direction for breaking their interlocking connections and permitting removal of the plug from the socket of such power supply connection.

As seen in FIG. 7, the central coupling connector 76-5 of casing coupling wall 76 is connected through one insulated conductor to the connector strip of the upper battery cell 21 of the column of battery cells 21 held within the battery casing 75. The secondary winding 63 of the transformer 60 is connected through a rectifier 64 to the inner end of the terminal connector 76-5 of casing coupling wall 76, and through its connection to battery terminal strip 28-1, for supplying rectified charging current of proper polarity to the positive pole of the upper cell of the serially-connected column of battery cells within the casing. The lowest opposite-polarity terminal 26 of the lowest cell 21 held in battery casing 75, is connected to the opposite end of secondary winding 63 through terminal lug 75-9. Except as described above, and shown in FIG. 7, the battery unit of FIG. 7 may be identical with those of FIGS. 3, 4 and 6 described above.

As stated above, each rechargeable battery unit for a flashlight or generally similar device which is to be supplied with power from such battery unit held therein, has to have two spaced metallic output terminals or terminal members which are removably held under contact pressure with load-circuit terminals of the load device that is to be supplied thereby, and also spaced metallic power input or recharging terminals through which the cell aggregate of the battery unit is connected to and recharged with direct current derived from a high-voltage, high-power circuit of an electric power supply. Since the metallic power output terminals must be exposed on the exterior of the battery unit and have to be connected to the charging circuit of the cell aggregate which is to be recharged from the high-voltage power supply, it is of critical importance to assure that any metallic terminal portions or other metallic circuit parts of the battery unit which are exposed on the exterior thereof, such as its battery output terminals, shall not subject the person handling such battery unit to an electric shock when the battery unit is being recharged by connecting or plugging in its two power input recharging terminals to the high-voltage power supply.

In accordance with a phase of the invention disclosed herein, one manner for assuring such shock-protection of a battery unit of the invention utilizes a transformer having a primary winding arranged to be connected through the power input terminal thereof to the high-voltage, high-power external power supply, and a secondary transformer winding including a rectifier which is insulated from the primary winding and is connected to the cell aggregate of the battery unit for thereby assuring that any exposed power output terminals of the battery unit or other metallic circuit portions of the battery unit, which are connected to the cell aggregate, shall be insulated from the circuit portions of the power input terminals of the battery unit and exclude the possibility of subjecting a person gripping the battery unit while it is being recharged, to higher-voltage, high-power electric shocks.

As claimed in the co-pending application Serial No. 843,397, filed September 30, 1959 by Robert J. McCarthy, and assigned to the same assignee, a rechargeable battery unit of the type described herein, having one set of exposed metallic power output terminals through which it is connected to the load circuit of a flashlight or other load device supplied thereby, and a further set of power-input or recharging terminals that are to be connected to a relatively high-voltage, high-capacity electric power supply for supplying recharging current, achieves such protection against high-voltage and high-power shocks without the use of a transformer with mutually insulated primary and secondary transformer windings, for insulating the cell aggregate and any exposed metallic circuit portions or terminals of the battery unit from the power-input terminals which are connected to the high-voltage, high-power external power supply.

In accordance with this phase of the invention, the desired insulation of exposed metallic circuit portions of such battery unit is secured without an insulating transformer, by combining its charging circuit with switch means and movable setting means or setting member arranged so that when the battery unit is to be connected to the external, higher-voltage battery-charging power circuit, the movable setting means are held in an input position or setting wherein it actuates the associated switch means to disconnect any exposed metallic terminals or metallic portions of the battery unit from the cell aggregate which is being recharged. The movable setting means of the battery unit is arranged to be moved from its input position or setting to a battery output position or setting wherein the associated switch means restore or reestablish the circuit connections from the cell aggregate of the battery unit to its two exposed output terminals through which it is connected to the load circuit for supplying battery operating power thereto.

As an example, a battery unit of the type described herein, for instance in connection with FIGS. 3, 4, 6 and 7, may be provided with a charging circuit and switch means associated therewith, which are operable by a movable setting means or setting member of the battery unit either (a) to an input switch setting for recharging the cells of the battery unit and also electrically insulate any exposed metallic battery output terminals or other metallic portions of the battery unit from the higher-voltage, high-power external power supply, or (b) to an output switch setting wherein the switching means re-establish the connections of the cell aggregate of the battery unit to its exposed battery output terminals through which the cell aggregate supplies battery power to the load device operated thereby. This, by way of example, in the battery unit of FIG. 4—from which the transformer has been eliminated—the movable battery end wall 66 may constitute the movable setting means or setting wall member which is movable either (a) to the full-line input position or setting for recharging its battery cells 21, or (b) to its dash-line position 66-0, which is its output setting for delivery of battery power to load circuits associated therewith. The battery unit of FIG. 4 has instead of the transformer 60, a charging circuit including switch means, the operation of which is controlled by the movement or position of a setting member or means which is formed by the upper terminal end wall 66. When the terminal end wall 66 is in the full-line position 66 shown, it sets its switch means in an input or charging setting wherein its charging circuit supplies its battery cells 21 with rectified direct current by way of the outwardly-projecting terminal plugs 51, 52 thereof and a rectifier circuit connected between them and the opposite end terminals of the column of battery cells 21 held within the battery casing 40 of the battery unit. The associated switch means are arranged to be actuated or operated by the terminal end wall or setting wall 66 to automatically disconnect the exposed metallic circuit portions of the battery unit from the charging circuit which is connected through the two power input plugs 51, 52 to the higher-voltage, high-power external power supply when the setting or terminal wall 66 is in the full-line input setting position 66.

In other words, instead of having a transformer for insulating exposed terminal or metallic portions of the battery unit from the high-voltage, high-power external charging circuit, for protecting a person gripping the battery unit against high-voltage, high-power shocks, the charging circuit of the battery unit of FIG. 4 is associated with switch means which are operative to different switching positions or settings by the movement of the terminal or setting end wall member 66 between its two setting positions—namely, its full-line input setting position 66 when recharging the battery unit, and the dash-line position 66–0 when delivering battery power to the load circuit of the associated device supplied thereby.

The switch means of such charging circuit are responsive to the different position-settings of the movable setting means, such as the setting end wall 66, to its different positions for insulating exposed metallic terminals or metallic portions of the battery unit from the charging circuit and the cells 21 when the setting wall 66 is in the recharging or input setting and the two power-input recharging terminals 51, 52 are plugged in into the higher-voltage, high-power supply circuit. Upon movement of the terminal or setting end wall 66 from the full-line input or setting position shown, to the dash-line output position or setting 66–0, the switch means associated with the charging circuit is operated or actuated to an output setting wherein its battery cells 21 are connected to the exposed metallic terminals of the battery unit through which it supplies battery power to the associated load device circuit, which exposed terminals are automatically disconnected and insulated by the switch means when they are actuated to the recharging or input switch position or setting by movement of the setting end or terminal end wall 66 to the full-line position shown. With a charging circuit having such automatically operating switch means, the exposed metallic bottom casing wall 26 of the lowest battery cell 21 of the battery unit of FIG. 4, is maintained insulated from the metal casing 40 and separated, as by an insulation layer or washer, such as washer 43–1, from another metallic underlying terminal end wall of the battery unit which then constitutes the exposed bottom terminal of the so-modified battery unit. The connection of such battery end wall to the cells 21 of the column of battery cells, is controlled by the associated switch means for disconnecting such additional metallic battery end wall terminal from the battery cells 21 and the charging circuit of the battery unit when the associated switch means are actuated by the movement of the upper terminal or setting end wall to its full-line position 66 shown.

FIG. 8 is a cross-sectional view similar to that of FIG. 6, showing a battery unit of the type described therein, which combines the charging circuit with switch means responsive to the settings or positions of a movable wall or setting member thereof for disconnecting all exposed metallic terminals and/or metallic circuit portions of the battery unit from its cell aggregate when they are being recharged from a high-voltage, high-power circuit, and restoring the circuit connections of the exposed terminals to the battery cells when the battery unit is to be held in the associated load device for supplying battery power thereto, for instance in the manner indicated diagrammatically in FIG. 1.

The battery unit of FIG. 8 has a principal battery structure holding enclosed in a metallic casing 81 a column of battery cells 21, and having an upper casing terminal wall 72, which are identical with the corresponding elements 71, 21 and 72 of the battery unit of FIG. 6, and require no further explanation. The upper casing terminal wall 72 of FIG. 8 has two outwardly-projecting recharging power input plugs 51, 52, as in FIG. 6, whereby the battery structure is plugged into a socket of a relatively high-voltage, high-capacity domestic power supply for recharging the battery cells when the associated setting member formed by the upper terminal end wall 83 of the battery unit is removed from its output position or setting shown in FIG. 8, to an input position or setting which exposes the power input terminals 51, 52 on the top of the casing terminal wall 72. The upper terminal end wall 83 is identical with the corresponding upper terminal end wall 73 of FIG. 6, and constitutes with the upwardly-projecting upper battery output terminal 83–1 affixed and carried therein, the movable setting means or member thereof.

In the battery unit of FIG. 8, the casing 81 has at the bottom thereof a distinct, exposed metallic battery output terminal 82–1 shown in the form of a metal sheet blank which is held insulated by an insulating spacer 81–8 from the overlying metallic bottom cell casing wall and terminal of the lowest battery cell 21 of the cell aggregate held in the battery casing 81. A metallic connector shown in the form of an insulated connector strip 82–4 extends along the inner wall surface of the battery casing 81 from the insulated bottom output terminal wall 82–1 of the battery unit, and terminates in an upper stripped connector lug 82–5 which is exposed in the interior of the battery unit under the inward or bottom side of the insulating casing terminal wall 72. A metallic connector sheet 81–6 underlying and making contact engagement with the metallic bottom casing and terminal end wall 26 of the lowest battery cell 21 of the battery unit, is connected through a similar insulated metallic connector strip 81–6 extending along the inner wall surface of the battery casing 81 and terminates in a stripped, metallic connector lug 81–7 which is exposed under the inward surface of the upper casing terminal wall 72 of the battery unit.

The upwardly-projecting battery output terminal 73–1 of the movable upper terminal wall and setting member 83 has an inwardly-extending metallic connector rod or pin 83–6 which is free to move or pass through an opening in the insulating casing top wall 72 to the under side of the insulating casing terminal wall 72 along which the battery-charging circuit and associated switch means 85 are mounted. For the sake of clarity in illustrating the charging circuits and the associated switch means, the casing 81 of the battery structure is shown provided with an exaggerated, relatively large compartment space underlying the upper casing terminal wall 72, although very little space is required for these elements of the built-in charging circuit. The charging circuit of battery unit of FIG. 8 does not have a circuit-insulating transformer, but a battery-charging circuit which is directly connected by its switch means 85 between its charge input terminals 51, 52 and the opposite poles of its cell aggregate 21. The battery unit of FIG. 8 may be provided with a conventional full-wave rectifying circuit such as described, for instance, in connection with FIG. 3.1 to FIG. 3.4 of "Electronic Circuits and Tubes," published in 1947, by Cruft Laboratory.

The battery unit is shown provided with a half-wave rectifying circuit shown as including a diode 84–1 and a current-limiting resistance 84–2 arranged to be connected through switch 85 between the inner connector lug 52–6 of power input terminal plug 51 and the connector strip 28–1 of the upper terminal 28 of the upper cell 21 of the battery unit. The charging and rectifying circuit is completed by connecting the metal bottom casing and terminal wall 26 of the lowest battery cell of the cell aggregate through the insulated connector lead or strip 81–6 and contacts of switch 85, to the inner connector lug 52–6 of the other power input terminal plug 52 of the battery unit. A capacitor 84–3 is shown connected in a conventional way across the charging circuit for smoothing out the current charges supplied to the cells 21 of the battery unit. The switch 85 may be of any known type, and is shown as a conventional multi-blade switch having two movable switch arms 85–1, 85–3 cooperating with associated switch contacts of the switch which is held suitably affixed to the under side of the insulating upper casing terminal wall 72. In the switch 85 shown, movable switch arm 85–1 has a metallic nose 85–2 which is flexed from the released to an operated position by metallic sliding contact engagement with the inward terminal pin 83–6 of the upper battery output terminal 86–3 when it is moved with its supporting terminal and setting wall member 83 from the removed or charge-input setting to its battery output position or setting shown in FIG. 8.

In the shown output setting of the battery unit of FIG.

8, switch 85 is held fixed in the setting by the engagement of the metallic contact nose 85-2 with the inward connector pin 83-6 of the upper battery output terminal 83-1 of the movable setting and terminal wall 83 held in its output setting shown. In this operative output setting position, the switch 85 operates as follows:

The flexed blade 85-1 is disconnected from the associated switch blade and is connected through its metallic contact nose 85-2 with the inward connector pin 83-6 of the upper battery output terminal 83-1, and the so-flexed switch blade 85-1 connects the upper output terminal 83-1 of the battery unit to the upper terminal 28 of the upper cell of the column of battery cells 21 held in the battery unit 81. In the shown flexed output setting of switch 85, its other flexed and operated switch blade 85-3 makes contact with one of its associated switch contacts through which the connector lug 82-5 of the exposed bottom output battery terminal 82-1 is connected to upper connector lug 81-7 of the connector strip 81-6 from the bottom terminal wall 26 of the lowest cell 21 of the battery unit. In this shown flexed output setting of switch 85, the exposed upper terminal 83-1 of the battery unit and the exposed bottom output terminal 82-1 of the battery unit are thus connected to the opposite-polarity terminals of the array of superposed and serially-connected battery cells 21 held within the casing 81 of the battery unit.

When the upper terminal wall or setting member 83 is removed from its battery output setting shown, to the input setting thereof wherein the upper casing terminal wall 72 with its two projecting power input plugs 51, 52 are exposed for coupling with socket terminals of a conventional high-voltage, high-capacity electric power supply, the removal of the movable setting and terminal end wall member 83 from its shown battery output position and setting releases the engagement of the inward contact pin 83-6 of its output terminal 82-1 with the nose 85-2 of switch 85, thereby releasing the switch 85 from the flexed operated position shown, to the released non-operated position. When the switch 85 is so released from its flexed power output setting to its released non-operated power input position or setting, it operates as follows:

The released switch contact blade 85-1 makes contact with the associated switch blade through which it connects the upper cell terminal 28 of the upper cell 21 of the battery unit to the charging circuit including serially-connected resistance 84-2 and rectifying diode 84-1, and therethrough to one of the now exposed recharging power input plugs 51, 52 of the battery unit. The other switch blade 85-3, on being released from its shown flexed to the unflexed setting, breaks contact with one of its contact blades and thereby disconnects exposed bottom wall terminal 82-1 of the battery unit from the bottom terminal 26 of the lowest cell 21 of the battery unit. In its released, unflexed position, this other switch blade 85-3 makes contact with its opposite switch contact and thereby connects the bottom terminal wall of the lowest cell 21 of the battery unit to the other recharging power input plug 52 projecting outwardly from the casing terminal wall 72. Thus the release of the switch 85 from its flexed operative battery output setting shown, to the released non-operative and battery input and recharging setting, serves to insulate all exposed metallic terminals including bottom terminal 82-1 of the battery unit shown, from the high-voltage, high-power recharging circuit system when the movable terminal end wall and setting member 86 is removed from its battery output setting shown in FIG. 8 and is held in the removed battery input setting or position. A spacer member, for instance in the form of a tube 82-6, of suitable insulating material, positioned along the interior surface of the battery casing 81, may hold the under side of the upper casing terminal wall 73 spaced from the compressed, elastic washer 41-4, for providing the small space for the charging circuit and its switch means 85 while applying through rubber spacer 41-4 the proper bias pressure which holds the column of battery cells 21 fixed in their operative positions between the inwardly-turned bottom rim 81-2 and top rim 81-3 of the metallic casing 81.

The side walls of each metallic cell casing 25 of each battery cell 20 of the battery unit of FIG. 8 and of the other figures, may be covered by or enclosed in an insulating coating 25-1 of suitable resin material for insulating the side walls of each metallic cell casing 25 from the surrounding metallic battery casing 81. This feature may also be embodied in all the other battery units shown and described herein. The exterior walls of the metallic battery casing 81 may likewise be coated with an insulating coating 81-5 for keeping it insulated from the surrounding metal parts of the device in which it is operatively mounted.

Otherwise, the battery unit of FIG. 8 may embody all other features shown or described above in connection with FIGS. 2-7.

It should be noted that each of the different battery units shown or described herein may combine therein all features not shown or described in connection therewith, but embodied in all the other battery units shown or described herein.

In accordance with another phase of the present invention, a rechargeable battery unit of the invention of the type described above, designed for removable insertion in a casing of a conventional flashlight for operating the same, may in itself form the grippable body of a flashlight by attaching to one end of such battery unit a light-bulb mount carrying the flashlight bulb and arranged for detachable engagement with and connection to one end of the battery unit for supplying electric power to the light bulb thereof. Known types of flashlight bulbs have a flashlight casing which houses the batteries, with the top of such flashlight casing having detachably secured thereto, as by threads, a tubular or cylindrical support or mount having mounted therein and carrying the light bulb, the lens, as well as the reflector, of the flashlgiht.

In accordance with this phase of the invention, a light-bulb mount carrying the light bulb, the lens and the reflector of the type used in flashlights, is arranged to be detachably affixed to one end of a battery unit of the invention for connecting one central terminal of the light bulb to a central end terminal at one end of the battery unit, while connecting with a switch of the lens mount the opposite terminal of the light bulb through a connector portion of the bulb mount to the opposite battery terminals of a rechargeable battery unit of the invention of the type disclosed herein. FIG. 9 shows by way of example a light bulb mount carrying a flashlight bulb and associated reflector, and arranged for detachable coupling to one end of any one of the different forms of battery units shown herein, and other modifications thereof that will suggest themselves to those skilled in the art. Although the device of the invention exemplified by FIG. 9, may be operated with any one of the battery units shown in FIGS. 2 to 8, it will be described in connection with a battery unit of the type shown in FIG. 6, from which the setting member or upper terminal end member 73 with its upper battery output terminal 73-1 has been removed from its output setting position to an input setting position in which the two power input plugs 51, 52 of the battery are exposed and project upwardly therefrom.

Referring to FIG. 9, a battery unit generally similar to that of FIG. 6 is shown as having a tubular metallic casing 90 holding therein a column of superposed battery cells 21, as in the battery units of FIGS. 3 or 7. The battery casing has a bottom rim 91-1 underlying the lowest battery cell 21 and a retaining shoulder 91-2 overlying the elastic compression washer 41-4 with which the column of battery cells 21 is held fixed within the casing 90. The metallic casing bottom wall 26 of the lowest battery cell 21 of the cell aggregate is exposed through the open bottom rim 91–9 of the casing and constitutes the bottom terminal of the battery unit which is shown connected to its metallic casing 90. To the top casing section 91–3 of the battery casing 90, is secured a recharging input terminal 91–4, for instance of insulating, synthetic resin material, within which are held fixed the inward mounting portions of two outwardly-projecting recharging power input plugs 51, 52 which are designed for plugging in, for instance, into the wall socket of a domestic high-voltage, high-capacity power supply, as in the previous battery units.

The upper casing wall 91–4 may be held in position by a peened-over upper rim portion 91–7 of the casing 90 and a tubular spacer 91–5 of insulating resin, for instance, held clamped between the input terminal wall 91–4 and the compression washer 41–4. In the center of the upper casing terminal wall 91–4 is insulatingly mounted a metallic connector member 91–6 shown as a sleeve arranged to make connection with a connector pin 73–6 of a movable terminal end and setting wall such as shown at 73 in FIG. 6, or corresponding to the movable output-terminal and setting end wall 66 of FIGS. 3 and 4, which may be attached to the battery unit of FIG. 9, so as to connect its central outwardly-projecting battery output terminal 73–1 through its inner connector member 73–6 to the upper terminal of the upper cell 21 of the battery unit when it is to be removably used in a conventional flashlight casing for supplying the battery power to its light bulb.

The battery unit of FIG. 9 may be provided either with a transformer or an automatically operated switch, as described above, for assuring that when the battery unit is recharged by connecting its plugs 51, 52 to a high-capacity, high-voltage power circuit, its exposed battery terminals or circuit portions are insulated from the high-voltage circuit, thus protecting the user against power shocks.

The upper casing section 91–3 of the battery unit of FIG. 9 is shown provided with retaining means shown as screw threads formed therein for detachably engaging cooperating threads of a detachable battery output end wall, such as shown and described at 73 in connection with the battery unit of FIG. 6, by the threads 72–5 and 73–4 thereof. The threaded casing portion 91–5 of the battery unit of FIG. 9 is also arranged for detachably connecting thereto a threaded lower coupling portion 92–1 of a casing or mount 92 carrying a flashlight bulb 15 with its reflector 93 in the upper, wider casing portion 92–3 thereof. The light bulb casing 92 is shown as of tubular or cylindrical form, and a lens ring 92–4 holds affixed against the rim of its upper, wider casing section 92–3 the rim of reflector 93 and overlying lens 92–5. The reflector 93 may be formed of plastic, transparent insulating resin material, and the wide back surface of the reflector is or may be provided with a reflective coating, for instance, of aluminum deposited thereon.

All other operating elements that are carried by the flashlight attachment casing 92 of FIG. 9, namely the metallic bulb collar 15–2 with its insulated central bulb terminal, the metallic collar 93–2 of the reflector with its circular contact rim 93–5, and the bulb-clamping insulating sleeve 94, are identical or generally similar to corresponding operating elements held in the upper light-bulb section of the flashlight casing 10 of FIG. 1.

It also has a similar slidable switch strip 95–2 with an exposed actuating grip or button 95–3 operating to selectively connect or disconnect the light bulb 15 to or from the cell aggregate, in the same manner as the switch slider 10–2 of FIG. 1.

The insulating bulb-clamping sleeve 95 of the flashlight attachment of FIG. 9 carries at its central bottom region a downwardly-projecting metallic connector pin 94–5 which in the position shown makes contact with central terminal sleeve 91–6 of the encased battery unit 90, thereby connecting the central terminal of bulb 15 to the upper cell terminal 28 of the cells 21 held in the battery unit. The battery unit 90 of FIG. 9 may also be used as a rechargeable battery unit which may be removably positioned in the casing of a conventional flashlight, such as shown in FIG. 1. To this end, light-bulb casing attachment 92 is removed from its threaded connection 92–1 with the threaded upper casing section 91–3 of battery unit 90, and a movable battery terminal setting member, for instance similar to movable terminal member 73 of FIG. 6, may be attached to the threaded casing section 91–3, thereby providing the battery unit 90 of FIG. 9 with a detachably fixed upper battery output terminal such as output terminal 73–1 of FIG. 6.

In analogous ways, the upper movable terminal or setting member 66 of the battery units of FIGS. 3 and 4, and the upper movable terminal or setting member 77 of the battery unit of FIG. 7, may be provided with attachment means, such as threads or coupling teeth on their outer, circular or side surfaces, for detachably connecting thereto a flashlight-bulb-and-switch attachment operating in the same manner as that described in connection with FIG. 9.

The features and principles underlying the invention described above in connection with specific exemplifications thereof, will suggest to those skilled in the art many other modifications thereof. It is accordingly desired that the appended claims shall not be limited to any specific features or details shown and described in connection with the exemplifications thereof.

I claim:

1. In a rechargeable battery unit adapted to be interchangeable with conventional dry cells for energizing a load, such as a flashlight:
   an elongated tubular casing having two transverse end walls at its opposite ends each having an exposed metallic output end terminal,
   a cell aggregate connected between the two end terminals and including at least one rechargeable cell coaxially held in one casing section adjacent one end wall, a recharging circuit including rectifier means within the other casing section and having two outward projecting terminal prongs insertable into power supply socket,
   a transverse input wall underlying the other end wall and having affixed thereto said outward terminal prongs,
   said tubular casing also enclosing insulating means for insulating all exposed metallic parts of said battery unit for suppressing electric shock when said prongs engage the power supply,
   said one transverse end wall being movably secured to the adjoining casing section of said tubular casing and movable thereon between an outer output setting wherein the movable end wall has its one end terminal exposed beyond the end portions of said two prongs and a retracted input setting wherein said two terminal prongs project outwardly beyond the exterior of said movable end wall and said one end terminal.

2. In a rechargeable battery unit adapted to be interchangeable with conventional dry cells for energizing a load, such as a flashlight:
   an elongated metallic tubular casing having two transverse end walls at its opposite ends each having an exposed metallic output end terminal,
   an insulating layer over at least the major exterior tubular surface of said casing,
   a cell aggregate connected between the two end terminals and including at least one rechargeable cell coaxially filling one casing section adjacent one end wall,
   each cell having a tubular metallic casing and an insulating layer separating the cell casing from the surrounding elongated casing,
   a recharging circuit including rectifier means within the other casing section and having two outward projecting terminal prongs insertable into power supply socket, a transverse input wall underlying the other end wall and having affixed thereto said outward terminal prongs, said tubular casing also enclosing insulating means for insulating all exposed metallic parts of said battery unit for suppressing electric shock when said prongs engage the power supply, said one transverse end wall being movably secured to the adjoining casing section of said tubular casing and movable thereon between an outer output setting wherein the movable end wall has its one end terminal exposed beyond the end portions of said two prongs and a retracted input setting wherein said two terminal prongs project outwardly beyond the exterior of said movable end wall and its one end terminal.

3. In a battery unit as claimed in claim 1, said adjoining casing section being of smaller cross sectional area than the other casing section and said movable end wall and said other casing section being of substantially the same cross sectional area.

4. In a battery unit as claimed in claim 3, said movable end wall being slidable on the adjoining casing section and having openings through which said two prongs move to their output setting.

5. In a battery unit as claimed in claim 4, said movable end wall having a tubular wall extension surrounding the adjoining casing section on which it slides between the two settings.

6. In a rechargeable battery unit as claimed in claim 5, the interior side of said movable end wall having metallic connector means for connecting its end terminal to its interior cell terminal.

References Cited in the file of this patent

UNITED STATES PATENTS

| 2,876,410 | Fry | Mar. 3, 1959 |
| 3,013,198 | Witte et al. | Dec. 12, 1961 |